United States Patent
Chen et al.

(10) Patent No.: US 10,068,317 B2
(45) Date of Patent: *Sep. 4, 2018

(54) METADATA-DRIVEN METHOD AND APPARATUS FOR CONSTRAINING SOLUTION SPACE IN IMAGE PROCESSING TECHNIQUES

(71) Applicant: Adobe Systems Incorporated, San Jose, CA (US)

(72) Inventors: Simon Chen, San Jose, CA (US); Jen-Chan Chien, Saratoga, CA (US); Hailin Jin, San Jose, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 404 days.

This patent is subject to a terminal disclaimer.

(21) Appl. No.: 13/683,166

(22) Filed: Nov. 21, 2012

(65) Prior Publication Data

US 2013/0089262 A1    Apr. 11, 2013

Related U.S. Application Data

(60) Division of application No. 12/251,261, filed on Oct. 14, 2008, now Pat. No. 8,340,453, and a
(Continued)

(51) Int. Cl.
*G06K 9/68*    (2006.01)
*G06T 5/00*    (2006.01)
(Continued)

(52) U.S. Cl.
CPC ............ *G06T 5/002* (2013.01); *G06K 9/6201* (2013.01); *G06T 3/0093* (2013.01);
(Continued)

(58) Field of Classification Search
None
See application file for complete search history.

(56) References Cited

U.S. PATENT DOCUMENTS

| 5,081,485 A | 1/1992 | Terashita |
| 6,097,854 A | 8/2000 | Szeliski et al. |

(Continued)

OTHER PUBLICATIONS

"Advisory Action", U.S. Appl. No. 12/201,824, (dated Jun. 3, 2010), 3 pages.
(Continued)

*Primary Examiner* — Vikkram Bali
(74) *Attorney, Agent, or Firm* — Wolfe-SBMC

(57) ABSTRACT

Methods and apparatus for constraining solution space in image processing techniques may use the metadata for a set of images to constrain an image processing solution to a smaller solution space. In one embodiment, a process may require N parameters for processing an image. A determination may be made from metadata that multiple images were captured with the same camera/lens and with the same settings. A set of values may be estimated for the N parameters from data in one or more of the images. The process may then be applied to each of images using the set of values. In one embodiment, a value for a parameter of a process may be estimated for an image. If the estimated value deviates substantially from a value for the parameter in the metadata, the metadata value is used in the process instead of the estimated value.

20 Claims, 25 Drawing Sheets

Related U.S. Application Data continuation-in-part of application No. 12/201,824, filed on Aug. 29, 2008, now Pat. No. 8,368,773.

(51) Int. Cl.
| | |
|---|---|
| *G06K 9/62* | (2006.01) |
| *G06T 3/00* | (2006.01) |
| *H04N 5/217* | (2011.01) |
| *H04N 5/232* | (2006.01) |
| *H04N 5/235* | (2006.01) |
| *H04N 1/32* | (2006.01) |

(52) U.S. Cl.
CPC ....... *H04N 1/32101* (2013.01); *H04N 5/2173* (2013.01); *H04N 5/2353* (2013.01); *H04N 5/2355* (2013.01); *H04N 5/23229* (2013.01); *H04N 5/23238* (2013.01); *H04N 2201/3252* (2013.01)

(56) References Cited

U.S. PATENT DOCUMENTS

| | | | |
|---|---|---|---|
| 6,198,852 | B1 | 3/2001 | Anandan et al. |
| 6,323,934 | B1 | 11/2001 | Enomoto |
| 6,389,181 | B2 | 5/2002 | Shaffer et al. |
| 6,434,272 | B1 | 8/2002 | Saarelma |
| 6,636,648 | B2 | 10/2003 | Loui et al. |
| 6,788,333 | B1 | 9/2004 | Uyttendaele et al. |
| 6,791,616 | B2 | 9/2004 | Tamaki et al. |
| 6,977,679 | B2 | 12/2005 | Tretter et al. |
| 6,987,623 | B2 | 1/2006 | Shibayama |
| 7,006,707 | B2 | 2/2006 | Peterson |
| 7,034,880 | B1 | 4/2006 | Endsley et al. |
| 7,065,255 | B2 | 6/2006 | Chen et al. |
| 7,075,985 | B2 | 7/2006 | Lee |
| 7,095,905 | B1 | 8/2006 | Peterson |
| 7,327,390 | B2 | 2/2008 | Gallagher |
| 7,424,170 | B2 | 9/2008 | Steinberg et al. |
| 7,446,800 | B2 | 11/2008 | Holmes |
| 7,519,907 | B2 | 4/2009 | Cohen et al. |
| 7,548,661 | B2 | 6/2009 | Lin et al. |
| 7,612,804 | B1 | 11/2009 | Marcu et al. |
| 7,822,292 | B2 | 10/2010 | Jin |
| 7,945,126 | B2 | 5/2011 | Meisner et al. |
| 8,023,772 | B2 | 9/2011 | Jin |
| 8,073,259 | B1 | 12/2011 | Jin |
| 8,194,993 | B1 | 6/2012 | Chen et al. |
| 8,340,453 | B1 | 12/2012 | Chen et al. |
| 8,368,773 | B1 | 2/2013 | Jin |
| 8,391,640 | B1 | 3/2013 | Jin |
| 8,675,988 | B2 * | 3/2014 | Chen ................... G06T 5/002 382/274 |
| 8,724,007 | B2 | 5/2014 | Chen et al. |
| 8,830,347 | B2 | 9/2014 | Jin |
| 8,842,190 | B2 | 9/2014 | Chen et al. |
| 2002/0029277 | A1 | 3/2002 | Simpson-Young et al. |
| 2002/0032375 | A1* | 3/2002 | Bauch .................. G06T 15/08 600/407 |
| 2002/0054224 | A1 | 5/2002 | Wasula et al. |
| 2002/0054241 | A1 | 5/2002 | Compton |
| 2002/0118890 | A1 | 8/2002 | Rondinelli |
| 2002/0146232 | A1 | 10/2002 | Harradine et al. |
| 2002/0154812 | A1 | 10/2002 | Chen et al. |
| 2002/0172517 | A1 | 11/2002 | Saito et al. |
| 2002/0181802 | A1 | 12/2002 | Peterson |
| 2003/0026609 | A1 | 2/2003 | Parulski |
| 2003/0063816 | A1 | 4/2003 | Chen et al. |
| 2003/0112339 | A1 | 6/2003 | Cahill et al. |
| 2003/0152283 | A1 | 8/2003 | Moriwaki |
| 2003/0206182 | A1 | 11/2003 | Kelly et al. |
| 2004/0095470 | A1 | 5/2004 | Tecu et al. |
| 2004/0150726 | A1 | 8/2004 | Gallagher |
| 2004/0174434 | A1 | 9/2004 | Walker et al. |
| 2004/0223063 | A1 | 11/2004 | DeLuca et al. |
| 2004/0233274 | A1 | 11/2004 | Uyttendaele et al. |
| 2005/0041103 | A1 | 2/2005 | Kingo |
| 2005/0063608 | A1 | 3/2005 | Clarke et al. |
| 2005/0068452 | A1 | 3/2005 | Steinberg et al. |
| 2005/0200762 | A1 | 9/2005 | Barletta et al. |
| 2005/0270381 | A1 | 12/2005 | Owens et al. |
| 2005/0286767 | A1 | 12/2005 | Hager et al. |
| 2006/0072176 | A1 | 4/2006 | Silverstein et al. |
| 2006/0093212 | A1 | 5/2006 | Steinberg et al. |
| 2006/0139474 | A1 | 6/2006 | Endsley et al. |
| 2006/0195475 | A1 | 8/2006 | Logan et al. |
| 2006/0239674 | A1* | 10/2006 | Manson et al. ............... 396/281 |
| 2006/0291747 | A1 | 12/2006 | Peterson |
| 2007/0031062 | A1 | 2/2007 | Pal et al. |
| 2007/0071317 | A1 | 3/2007 | Kubo et al. |
| 2007/0189333 | A1 | 8/2007 | Naaman et al. |
| 2007/0268411 | A1 | 11/2007 | Rehm et al. |
| 2007/0282907 | A1 | 12/2007 | Chambers |
| 2008/0088728 | A1 | 4/2008 | Omaki et al. |
| 2008/0101713 | A1 | 5/2008 | Edgar |
| 2008/0104404 | A1 | 5/2008 | Mergen et al. |
| 2008/0106614 | A1 | 5/2008 | Okuda et al. |
| 2008/0112621 | A1 | 5/2008 | Gallagher et al. |
| 2008/0174678 | A1* | 7/2008 | Solomon ............... 348/231.99 |
| 2008/0198219 | A1 | 8/2008 | Yoshida et al. |
| 2008/0284879 | A1 | 11/2008 | Hu |
| 2008/0285835 | A1 | 11/2008 | Holland et al. |
| 2009/0022421 | A1 | 1/2009 | Uyttendaele et al. |
| 2009/0083282 | A1 | 3/2009 | Benitez et al. |
| 2009/0092340 | A1 | 4/2009 | Arguelles |
| 2009/0169132 | A1 | 7/2009 | Sagawa |
| 2013/0077890 | A1 | 3/2013 | Chen |
| 2013/0121525 | A1 | 5/2013 | Chen |
| 2013/0124471 | A1 | 5/2013 | Chen |
| 2013/0142431 | A1 | 6/2013 | Jin |

OTHER PUBLICATIONS

"Final Office Action", U.S. Appl. No. 12/251,267, (dated Feb. 12, 2013), 9 pages.

"Non-Final Office Action", U.S. Appl. No. 12/251,253, (dated Dec. 8, 2011), 55 pages.

"Notice of Allowance", U.S. Appl. No. 12/201,822, (dated Aug. 21, 2012), 8 pages.

"Notice of Allowance", U.S. Appl. No. 12/201,824, (dated Feb. 27, 2012), 11 pages.

"Notice of Allowance", U.S. Appl. No. 12/251,258, (dated May 16, 2012), 8 pages.

"Notice of Allowance", U.S. Appl. No. 12/251,261, (dated Aug. 21, 2012), 7 pages.

"Notice of Allowance", U.S. Appl. No. 12/201,824, (dated Oct. 3, 2012), 6 pages.

"Restriction Requirement", U.S. Appl. No. 12/201,824, (dated Jan. 31, 2011), 5 pages.

"Restriction Requirement", U.S. Appl. No. 12/251,253, (dated Aug. 9, 2011), 5 pages.

"Restriction Requirement", U.S. Appl. No. 12/251,261, (dated Nov. 3, 2011), 8 pages.

"Restriction Requirement", U.S. Appl. No. 12/251,267, (dated May 8, 2012), 5 pages.

"U.S. Application as Filed", U.S. Appl. No. 12/201,822, (dated Aug. 29, 2008), 55 pages.

"U.S. Application as Filed", U.S. Appl. No. 12/251,261, (dated Oct. 14, 2008), 110 pages.

Jin, Hailin "Application as Filed", U.S. Appl. No. 12/201,824, (dated Aug. 29, 2008), 62 pages.

"Advisory Action", U.S. Appl. No. 12/251,267, dated Apr. 7, 2014, 3 pages.

"Corrected Notice of Allowance", U.S. Appl. No. 13/683,966, dated Feb. 4, 2014, 2 pages.

"Final Office Action", U.S. Appl. No. 12/251,267, dated Jan. 30, 2014, 7 pages.

"Final Office Action", U.S. Appl. No. 13/757,518, dated Jan. 27, 2014, 20 pages.

(56) References Cited

OTHER PUBLICATIONS

"Notice of Allowance", U.S. Appl. No. 12/251,253, dated Jan. 22, 2014, 8 pages.
"Non-Final Office Action", U.S. Appl. No. 13/683,966, (dated Apr. 5, 2013), 14 pages.
Boutell, et al., "Photo Classification by Integrating Image Content and Camera Metadata", *Proceedings of the 17th International Conference on Pattern Recognition*, vol. 4, (Aug. 2004), 4 Pages.
"Notice of Allowance", U.S. Appl. No. 12/251,267, dated May 1, 2014, 10 pages.
"Notice of Allowance", U.S. Appl. No. 13/757,518, dated May 28, 2014, 9 pages.
Office Action from U.S. Appl. No. 12/201,824, dated Apr. 29, 2011, Hailin Jin, pp. 1-41.
Office Action from U.S. Appl. No. 12/201,824, dated Oct. 20, 2011, Hailin Jin, pp. 1-42.
Office Action from U.S. Appl. No. 12/251,258, dated Oct. 19, 2011, Simon Chen, et al., pp. 1-18.
Office Action from U.S. Appl. No. 12/251,261, dated Jan. 17, 2012, Simon Chen, et al., pp. 1-11.
Office Action from U.S. Appl. No. 12/201,822, dated Feb. 2, 2012, Hailin Jin, pp. 1-8.
Kinghorn, Jay; Metadata: "Today's Workflow, Tomorrow's Automation?", Professional Digital Workflow Tech Brief, 2007, pp. 1-3.
Goldman, D.B.; Chen, Jiun-Hung; "Vignette and Exposure Calibration and Compensation," Tenth IEEE International Conference on Computer Vision, 2005, Publication Date: Oct. 17-21, 2005, vol. 1, On pp. 899-906.
"Exchangeable image file format for digital still cameras," Exif Version 2.2, Technical Standardization Committee on AV & IT Storage Systems and Equipment, Japan Electronics and Information Technology Industries Association, Apr. 2002, pp. 1-148.
U.S. Appl. No. 12/251,253, filed Oct. 14, 2008, Simon Chen, et al.
U.S. Appl. No. 12/251,258, Simon Chen, et al., filed Oct. 14, 2008.
U.S. Appl. No. 12/251,267, Simon Chen, et al., filed Oct. 14, 2008.
Photoshop CS3 Features http://www.photoshopcafe.com/cs3/CS3.htm, Dec. 17, 2006, pp. 1-7.
Auto Align Layers and Auto Blend Layers (tutorial for Photoshop CS3 Auto Align)—Colin Smith—photoshopCAFE http://www.photoshopcafe.com/Cs3/smith-aa.htm, Dec. 19, 2006, pp. 1-3.
Alain Briot, DxO Optics Pro v5—A Review and Tutorial, DXO Image Science, (Feb. 2008), pp. 1-20.
Jan Kybic, et al., "Unwarping of Unidirectionally Distorted EPI Images," IEEE Transactions on Medical Imaging, vol. 19, Issue 2, pp. 80-93, Feb. 2000.
Rohlfing, et al., "Unwarping Confocal Microscopy images of Bee Brains by Nonrigid Registration to a Magnetic Resonance Microscopy Image," Journal of Biomedical Optics, vol. 10(2), Mar./Apr. 2005, pp. 1-8.
Web site stitcher.realviz.com from May 29, 2008 via the Wayback maching at http://web.archive.org/web20080529054856/http://stitcher.realviz.com/, p. 1.
Review of REALVIZ Stitcher 5 by Jeff Mottle—CGarchitect.com, http://www.cgarchitect.com/news/Reviews/Review046.1.asp, (Jan. 13, 2006 date via Wayback Machine at http://web.archive.org), pp. 1-6.
"Panorama Tutorials," Realviz Stitcher 5.1, by Dr. Karl Harrison (Dec. 3, 2006), http://www.chem.ox.ac.uk/oxfordtour/tutorial/index.asp?ID=17&pagename=Realviz%20Stitcher%205.1, pp. 1-8.
"Software Review: RelViz Stitcher 5.6 Panorama Maker," by David FitzSimmons, Feb. 2008, http://web4.popphoto.com/photosoftware/5138/software-review-realvizstitcher-56-panorama-maker.html, pp. 1-3.
"PTLens", Web site http://epaperpress.com/ptlens/ from Jun. 19, 2008 via the Wayback Machine at http://web.archive.org; http://web.archive.org/web/20080619120828/http://epaperpress.com/ptlens/, pp. 1-2.
Office Action from U.S. Appl. No. 12/251,253, Simon Chen, et al., dated Jun. 4, 2012, pp. 1-61.
Office Action from U.S. Appl. No. 12/251,267, Simon Chen, et al., dated Aug. 15, 2012, pp. 1-26.
Jin, H., Jun. 2008, "A Three-Point Minimal Solution for Panoramic Stitchin with Lens Distortion," In CVPR 2008: IEEE Computer Society Conference on Computer Vision and Pattern Recognition, pp. 1-8.
M. Brown, et al., "Minimal Solutions for Panoramic Stitching," In Proc. of IEEE Conf. on Computer Vision and Pattern Recognition, 2007, pp. 1-8.
H.S. Sawhney, et al., "Tru Multi-Image Alignment and its Application to Mosaicing and Lens Distortion Correction," IEEE Trans. on Pattern Analysis and machine Intelligence, 21(3):235-243, Mar. 1999, pp. 1-9.
"Non-Final Office Action", U.S. Appl. No. 12/251,267, (dated Sep. 6, 2013), 26 pages.
"Notice of Allowance", U.S. Appl. No. 13/683,966, (dated Nov. 29, 2013), 14 pages.
Kang, et al., "Metadata for Efficient Storage and Retrieval of Life Long Media", *Proceedings of the IEEE International Conference on Multisensor Fusions and Integration for Intelligent Systems*, (Aug. 20, 2008), pp. 687-690.
"Non-Final Office Action", U.S. Appl. No. 13/757,518, (dated Aug. 27, 2013), 18 pages.
"Non-Final Office Action", U.S. Appl. No. 12/251,253, (dated Aug. 29, 2013), 65 pages.

\* cited by examiner

```
<rdf:li rdf:parseType="Resource">
    <stCamera:Make>{MANUFACTURER}</stCamera:Make>
    <stCamera:LensPrettyName>{LENS NAME} 8mm f/3.5</stCamera:LensPrettyName>
    <stCamera:Lens>8.0 mm f/3.5</stCamera:Lens>
    <stCamera:LensInfo>80/10 80/10 35/10 35/10</stCamera:LensInfo>
    <stCamera:FishEyeLens>True</stCamera:FishEyeLens>
    <stCamera:FishEyeModelParams>
    <rdf:Seq>
        <rdf:li>7.21</rdf:li>
        <rdf:li>-17.13</rdf:li>
        <rdf:li>9.18</rdf:li>
        <rdf:li>-33.27</rdf:li>
        <rdf:li>977.565</rdf:li>
    </rdf:Seq>
</stCamera:FishEyeModelParams>
```

Figure 7

| Tag Name | Field Name |
|---|---|
| (Tags relating to image data structure) | |
| Image width | ImageWidth |
| Image height | ImageLength |
| Number of bits per component | BitsPerSample |
| Compression scheme | Compression |
| Pixel composition | PhotometricInterpretation |
| Orientation of image | Orientation |
| Number of components | SamplesPerPixel |
| Image data arrangement | PlanarConfiguration |
| Subsampling ratio of Y to C | YCbCrSubSampling |
| Y and C positioning | YCbCrPositioning |
| Image resolution in width direction | XResolution |
| Image resolution in height direction | YResolution |
| Unit of X and Y resolution | ResolutionUnit |
| (Tags relating to recording offset) | |
| Image data location | StripOffsets |
| Number of rows per strip | RowsPerStrip |
| Bytes per compressed strip | StripByteCounts |
| Offset to JPEG SOI | JPEGInterchangeFormat |
| Bytes of JPEG data | JPEGInterchangeFormatLength |
| (Tags relating to image data characteristics) | |
| Transfer function | TransferFunction |
| White point chromaticity | WhitePoint |
| Chromaticities of primaries | PrimaryChromaticities |
| Color space transformation matrix coefficients | YCbCrCoefficients |
| Pair of black and white reference values | ReferenceBlackWhite |
| (Other tags) | |
| File change date and time | DateTime |
| Image title | ImageDescription |
| Image input equipment manufacturer | Make |
| Image input equipment model | Model |
| Software used | Software |
| Person who created the image | Artist |
| Copyright holder | Copyright |

*Figure 11A*

| Tag Name | Field Name |

(Tags Relating to Version)
    Exif version                                              ExifVersion
    Supported Flashpix version                FlashpixVersion (Tag Relating to Image Data Characteristics)
    Color space information                   ColorSpace (Tags Relating to Image Configuration)
    Meaning of each component          ComponentsConfiguration
    Image compression mode              CompressedBitsPerPixel
    Valid image width                           PixelXDimension
    Valid image height                         PixelYDimension (Tags Relating to User Information)
    Manufacturer notes                       MakerNote
    User comments                             UserComment (Tag Relating to Related File Information)
    Related audio file                          RelatedSoundFile (Tags Relating to Date and Time)
    Date and time of original data generation    DateTimeOriginal
    Date and time of digital data generation     DateTimeDigitized
    DateTime subseconds                  SubSecTime
    DateTimeOriginal subseconds        SubSecTimeOriginal
    DateTimeDigitized subseconds       SubSecTimeDigitized (Other Tags)
    Unique image ID                          ImageUniqueID

*Figure 11B*

| Tag Name | Field Name |
|---|---|
| (Tags Relating to Picture-Taking Conditions) | |
| Exposure time | ExposureTime |
| F number | FNumber |
| Exposure program | ExposureProgram |
| Spectral sensitivity | SpectralSensitivity |
| ISO speed rating | ISOSpeedRatings |
| Optoelectric conversion factor | OECF |
| Shutter speed | ShutterSpeedValue |
| Aperture | ApertureValue |
| Brightness | BrightnessValue |
| Exposure bias | ExposureBiasValue |
| Maximum lens aperture | MaxApertureValue |
| Subject distance | SubjectDistance |
| Metering mode | MeteringMode |
| Light source | LightSource |
| Flash | Flash |
| Lens focal length | FocalLength |
| Subject area | SubjectArea |
| Flash energy | FlashEnergy |
| Spatial frequency response | SpatialFrequencyResponse |
| Focal plane X resolution | FocalPlaneXResolution |
| Focal plane Y resolution | FocalPlaneYResolution |
| Focal plane resolution unit | FocalPlaneResolutionUnit |
| Subject location | SubjectLocation |
| Exposure index | ExposureIndex |
| Sensing method | SensingMethod |
| File source | FileSource |
| Scene type | SceneType |
| CFA pattern | CFAPattern |
| Custom image processing | CustomRendered |
| Exposure mode | ExposureMode |
| White balance | WhiteBalance |
| Digital zoom ratio | DigitalZoomRatio |
| Focal length in 35 mm film | FocalLengthIn35mmFilm |
| Scene capture type | SceneCaptureType |
| Gain control | GainControl |
| Contrast | Contrast |
| Saturation | Saturation |
| Sharpness | Sharpness |
| Device settings description | DeviceSettingDescription |
| Subject distance range | SubjectDistanceRange |

Figure 11C (Information used, for example, to match camera/lens profile to image metadata)

Camera make/model
    Lens make/model
    Known lens characteristics
        Focal length
        F Number
        Lens type (i.e., fisheye, telephoto, etc.)
        Aperture
    Exposure
    Known sensor/captured image characteristics

...

(Information that may be retrieved for various image processing techniques; this information may have been generated in a calibration process)
    [Vignetting model paramters]
    [Lens distortion model parameters]
    [Chromatic distortion model parameters]
    [Sensor noise model parameters]
    Camera sensor response curve
    Camera sensor format factor

METADATA-DRIVEN METHOD AND APPARATUS FOR CONSTRAINING SOLUTION SPACE IN IMAGE PROCESSING TECHNIQUES

CONTINUATION DATA

This application is a Divisional of U.S. patent application Ser. No. 12/251,261, filed Oct. 14, 2008, and is a Continuation-In-Part of U.S. patent application Ser. No. 12/201,824, entitled "Metadata-Driven Method and Apparatus for Automatically Aligning Distorted Images" filed Aug. 29, 2008, the contents of which are incorporated by reference herein in their entirety.

BACKGROUND

Description of the Related Art

Image capture devices, such as cameras, may be used to capture an image of a section of a view or scene, such as a section of the front of a house. The section of the view or scene whose image is captured by a camera is known as the field of view of the camera. Adjusting a lens associated with a camera may increase the field of view. However, there is a limit beyond which the field of view of the camera cannot be increased without compromising the quality, or "resolution", of the captured image. Further, some scenes or views may be too large to capture as one image with a given camera at any setting. Thus, it is sometimes necessary to capture an image of a view that is larger than can be captured within the field of view of a camera. In these instances, multiple overlapping images of segments of the view or scene may be taken, and then these component images may be joined together, or merged, to form a composite image.

One type of composite image is known as a panoramic image. A panoramic image may have a rightmost and leftmost image that each overlap only one other image, or alternatively the images may complete 360°, where all images overlap at least two other images. In the simplest type of panoramic image, there is one row of images, with each image at most overlapping two other images. However, more complex composite images may be captured that have two or more rows of images; in these composite images, each image may potentially overlap more than two other images. For example, a motorized camera may be configured to scan a scene according to an M×N grid, capturing an image at each position in the grid. Other geometries of composite images may be captured.

Computer programs and algorithms exist for assembling a single composite image from multiple potentially overlapping component images. A general paradigm for automatic image stitching techniques is to first detect features in individual images; second, to establish feature correspondences and geometric relationships between pairs of images (pair-wise stage); and third, to use the feature correspondences and geometric relationships between pairs of images found at the pair-wise stage to infer the geometric relationship among all the images (multi-image stage).

Panoramic image stitching is thus a technique to combine and create images with large field of views. Feature-based image stitching techniques are image stitching techniques that use point-correspondences, instead of image pixels directly, to estimate the geometric transformations between images. An alternative to feature-based image stitching techniques is intensity-based stitching techniques that use image pixels to infer the geometric transformations. Many image stitching implementations make assumptions that images are related either by 2D projective transformations or 3D rotations. However, there are other types of deformations in images that are not captured by the aforementioned two, for instance, lens distortions.

Panoramic image alignment is the problem of computing geometric relationships among a set of component images for the purpose of stitching the component images into a composite image. Feature-based techniques have been shown to be capable of handling large scene motions without initialization. Most feature-based methods are typically done in two stages: pair-wise alignment and multi-image alignment. The pair-wise stage starts from feature (point) correspondences, which are obtained through a separate feature extraction and feature matching process or stage, and returns an estimate of the alignment parameters and a set of point-correspondences that are consistent with the parameters. Various robust estimators or hypothesis testing frameworks may be used to handle outliers in point-correspondences.

The multi-image stage may use various techniques to further refine the alignment parameters, jointly over all the images, based on the consistent point-correspondences retained in the pair-wise stage. It is known that the convergence of the multi-image stage depends on how good the initial guesses are. However, an equally important fact that is often overlooked is that the quality of the final result from the multi-image stage depends on the number of consistent point-correspondences retained in the pair-wise stage. When the number of consistent point-correspondences is low, the multi-image alignment will still succeed, but the quality of the final result may be poor.

In the pair-wise stage, it is commonly assumed that an imaging system satisfies an ideal pinhole model. As a result, many conventional methods only estimate either 3×3 homographies or "rotation+focal lengths". However, real imaging systems have some amount of lens distortion. Moreover, wide-angle and "fisheye" lenses that are commonly used for shooting panoramic images tend to introduce larger distortions than regular lenses. Modeling lens distortion is critical for obtaining high-quality image alignment.

Radially symmetric distortion, or simply radial distortion, is a particular type of image distortion that may be seen in captured images, for example as a result of the optical characteristics of lenses in conventional film and digital cameras. In addition to radial distortion being introduced into images by lenses during image capture, radial distortion may be applied as an effect to either natural images (images of the "real world" captured with a conventional or digital camera) or synthetic images (e.g., computer-generated, or digitally synthesized, images). Radial distortion may be classified into two types: barrel distortion and pincushion distortion. FIG. 1A illustrates barrel distortion, and FIG. 1B illustrates pincushion distortion. Note that barrel distortion is typically associated with wide-angle and fisheye lenses, and pincushion distortion is typically associated with long-range or telescopic lenses.

In digital image processing, an unwarping process renders an image with little or no radial distortion from an image with radial distortion. FIG. 2A illustrates an unwarping process 202 rendering an image with little or no distortion 200B from an input image with barrel distortion 200A. FIG. 2B illustrates an unwarping process 202 rendering an image with little or no distortion 200D from an input image with pincushion distortion 200C. Note that the images in FIGS. 2A and 2B may be images digitized from photographs or negatives captured with a conventional camera, images captured with a digital camera, digitally synthesized images, composite images from two or more sources, or in general images from any source.

Conventionally, in digital image processing, unwarping 202 of radially distorted images has been performed using a two-dimensional (2-D) sampling process. For example, in a conventional unwarping process, a grid may be set in the output image (the image without radial distortion). For each point in the grid, a corresponding location is found in the input image (the image with radial distortion) by applying a distortion equation. Since this location may not have integral coordinates, 2-D interpolation may be used to obtain the color/intensity value for the corresponding pixel.

As mentioned above, panoramic image alignment is the process of computing geometric relationships among a set of component images for the purpose of stitching the component images into a composite image. A problem in panoramic image stitching is how to register or align images with excessive distortion, such as images taken with wide-angle or fisheye lenses. Because of the large amount of distortion, conventional alignment workflows, including those modeling lens distortion, do not work well on such images. Another problem is how to efficiently unwarp the distorted images so that they can be stitched together to form a new image, such as a panorama.

A conventional method for aligning and unwarping images with excessive distortion is to unwarp the images with a pre-determined function onto a flat plane and then register the unwarped rectilinear version of the image using regular plane-projection based alignment algorithms. There are problems with this approach. For example, for images with a large amount of distortion such as images captured with fisheye lenses, the unwarped images tend to be excessively large. In addition, for images captured with some fisheye lenses, it is not even possible to unwarp an entire image to a flat plane because the field-of-view is larger than 180 degrees, and thus some sacrifices may have to be made.

As another example of problems with conventional methods for aligning and unwarping images with excessive distortion, the pre-determined unwarping functions may only do a visually acceptable job for unwarping images. Visually, the unwarped images may appear rectilinear. However, the images may not in fact be 100% rectilinear. The reason is that the pre-determined unwarping functions are conventionally obtained based on some standard configurations and are not adapted to the particular combination of camera and lens used to capture the image. Thus, conventional unwarping functions are not exact, and thus may introduce error in alignment and stitching.

Furthermore, rectilinear images generated by conventional unwarping algorithms may suffer from aliasing. Aliasing refers to a distortion or artifact that is caused by a signal being sampled and reconstructed as an alias of the original signal. An example of image aliasing is the Moiré pattern that may be observed in a poorly pixelized image of a brick wall. Conventional unwarping algorithms, which perform interpolation in 2-D space, may by so doing introduce aliasing artifacts into the output images. The aliasing artifacts may be another source of error in alignment and stitching.

In addition to the above, conventional unwarping algorithms are not very efficient. The distortion equation has to be solved for each point in the image. In addition, interpolation is done in two-dimensional (2-D) space, which is inefficient when sophisticated interpolation algorithms such as cubic interpolation are used.

Another conventional method for aligning and unwarping images with excessive distortion is to compute the unwarping function and alignment model all in the one step. This may yield better results. However, a problem with this method is that it is hard to optimize both the unwarping function and the alignment model because of the excessive distortion in images. There also may need to be a custom version of the code for each different combination of an unwarping function and an alignment model.

"Adobe", "Camera RAW", "Photoshop", and "XMP" are either registered trademarks or trademarks of Adobe Systems Incorporated in the United States and/or other countries.

SUMMARY

Various embodiments of metadata-driven methods and apparatus for constraining solution space in image processing techniques are described. Many image processing algorithms can be considered and implemented as optimization problems over a given solution space. Typically, the solution is not unique. Embodiments may use the metadata for a set of images to constrain the solution to a smaller solution space for the set of images, thus achieving better results and in some cases reducing processing expense and time.

In one embodiment a particular process that is to be applied to two or more images and that requires N parameters to be calculated for processing an image may be determined, for example by examining metadata corresponding to the two or more images. A determination may be made from the metadata that the two or more images were captured with the same camera/lens combination and with the same camera and lens settings. A set of values may be estimated for the N parameters from data in one or more of the two or more images in response to determining that the two or more images were captured with the same camera/lens combination and with the same camera and lens settings. The particular process may then be applied to each of the two or more images to generate one or more output images; the one set of calculated estimated values for the N parameters is used by the particular process for all of the two or more images.

The particular process may be, for example, a vignette removal process, an lens distortion (e.g., geometric distortion) removal process, a chromatic aberration removal process, or a sensor noise removal process, and the N parameters include one or more parameters used in the particular process.

In one embodiment, a value for a parameter to be used in a digital image processing technique when applied to an image may be estimated, for example from image content of the image. A value for the parameter, determined when capturing the image, may be obtained from metadata corresponding to the image. A determination may be made that the difference between the estimated value for the parameter and the value for the parameter obtained from the metadata exceeds a threshold. The digital image processing technique may be applied to the image to generate an output image, with the value for the parameter obtained from the metadata used in the digital image processing technique instead of the estimated value in response to determining that the difference exceeds the threshold. In one embodiment, the digital image processing technique is a vignette removal process, and the parameter is exposure.

BRIEF DESCRIPTION OF THE DRAWINGS

FIG. 7 shows an exemplary camera/lens profile for a single camera/lens, according to one embodiment.

FIGS. 11A through 11C list attribute information for EXIF image files for EXIF version 2.2.

FIG. 12 illustrates information that may be included in a camera/lens profile for each camera/lens combination according to some embodiments.

Figure 1A:
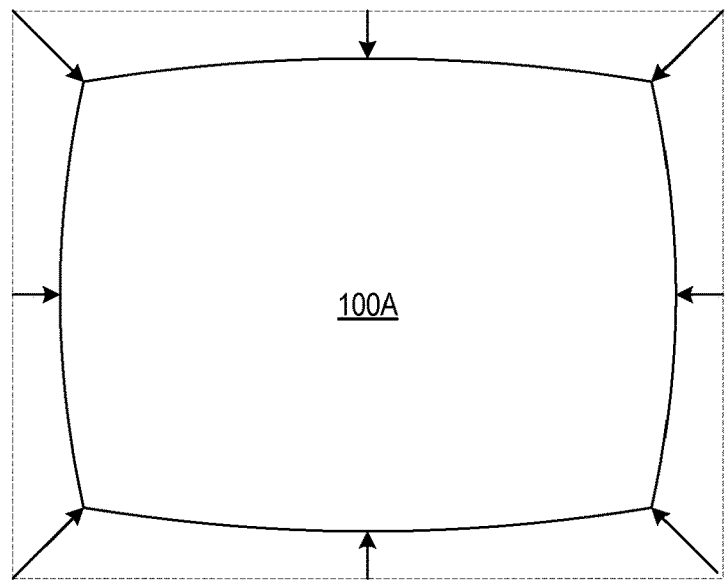
FIGS. 1A and 1B illustrate barrel distortion and pincushion distortion, respectively.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of methods and apparatus for metadata-driven processing of multiple images are described. In embodiments, metadata from an input set of images may be used in directing and/or automating a multi-image processing workflow. The metadata may be used, for example, in sorting the set of input images into two or more categories, or buckets, in making decisions or recommendations as to a particular workflow process that may be appropriate for the set of images or for one or more subsets of the set of images, in determining particular tasks or steps to perform or not perform on the set of images during a workflow process, in selecting information such as correction models to be applied to the set of images during a workflow process, and so on.

In embodiments, the metadata for an image may be accessed to determine, for example, what particular lens and/or camera the image was taken with and conditions under which the image was captured (e.g., focal length, focal distance, exposure time, time stamp (date and time), etc.). Generally, a camera stores most if not all of at least this information in image metadata. Since there may be variation in metadata formats and content, embodiments may use different techniques to obtain similar information from metadata according to the camera manufacturer (camera make) or in some cases according to camera model of the same manufacturer.

In embodiments, the image metadata may be accessed and applied in a metadata-driven multi-image processing method to direct and/or automate various aspects or processes of a multi-image processing workflow or workflows. As an example of using metadata in multi-image processing, the image metadata for a set of images may be examined, to determine an appropriate or optimal workflow for the set of images. Exemplary multi-image processing workflows may include, but are not limited to, a panoramic image stitching workflow, a high dynamic range (HDR) image generation workflow, a time-lapse image processing workflow, and a workflow for combining images where some images were captured using flash and other images were captured using no flash.

Digital Image Metadata

Most digital cameras store metadata with captured digital images. Generally, a metadata instance is stored with each captured image. However, various camera manufacturers may use different metadata formats in their digital camera models. Digital image metadata formats may include, but are not limited to, Exchangeable Image File Format (EXIF), a standard developed by the Japan Electronics and Information Technology Industries Association (JEITA); IPTC, a standard developed by the International Press Telecommunications Council; and Extensible Metadata Platform (XMP™) developed by Adobe™. In addition, there may be different versions of a digital image metadata format. For example, there is an EXIF version 2.1 and an EXIF version 2.2.

As an example of digital image metadata content, FIGS. 11A-11C list attribute information for EXIF image files for EXIF version 2.2. Other digital image metadata formats may include at least some similar content, and may include different or additional content. For example, geospatial information (e.g., geotagging, GPS (Global Positioning System) information, etc.) and/or camera orientation information (e.g., tilt, direction, etc) may be included in at least some image metadata.

In addition to different digital image metadata formats that may be used, there is no single standard for what information is stored in metadata or for exactly how the information is stored in the metadata that is used by all camera manufacturers for all models of cameras, even if the manufacturers use the same digital image metadata format. Thus, various manufacturers may store different or additional information in metadata captured using their cameras, or even different or additional metadata for different camera models, or may store information differently.

Camera/Lens Profile Database

In some embodiments, information obtained from the image metadata may be used to look up a camera/lens profile for the make/model of lens that was used to capture the component images in a file, database, table, or directory of camera/lens profiles. For simplicity, the term camera/lens profile database may be used herein. The camera/lens profile for a particular camera/lens combination may include information identifying the camera/lens combination that may be used to match the profile to image metadata corresponding to images captured using the camera/lens combination. The camera/lens profile for a particular camera/lens combination may also include other information that may be specific to the camera/lens combination and that may be used in various image processing techniques. Some of this information in the camera/lens profiles may, for example, have been previously generated by calibrating actual examples of the respective lenses and cameras in a calibration process. In one embodiment, a camera/lens combination may be calibrated at different settings, and a camera/lens profile may be created for each setting at which the camera/lens was calibrated. As an example of the application of image metadata and camera/lens profiles, parameters for one or more image processing models or functions may be generated for different camera/lens combinations, for example via a calibration process, and stored in respective camera/lens profiles. The image metadata for a set of input images may be used to look up a camera/lens profile for the set of images and thus to obtain the appropriate parameters to be used in applying the image processing model or function to the images. Examples of image processing models and functions may include, but are not limited to: a vignette model used in removing or reducing vignetting in images, a lens distortion model or function used to remove or reduce lens distortions such as an image unwarping function or fisheye distortion model used to unwarp distorted images, such as images captured using a fisheye lens; a chromatic aberration model used to reduce or remove chromatic aberrations (e.g., longitudinal or transverse chromatic aberrations); and a sensor noise model. The camera/lens profile for a particular camera/lens combination may also include other information, for example a camera sensor response curve and a camera sensor format factor. The camera sensor response curve is related to the sensitivity of the camera photosensor, and may be used in automatic brightness adjustment and color constancy adjustment. The camera sensor response curve may be used in a vignette removal process in estimating a vignette model. The camera sensor format factor may be used, for example, in adjusting or scaling camera/lens data in a particular profile. For example, a particular camera/lens profile may have been generated via calibrating a particular lens with a particular camera body. If an image or images need to be processed for which the metadata indicates the images were captured using the same type of lens but with a different camera body or with different camera settings, the sensor format factor may be used to scale, for example, a lens distortion model for application to the image or images.

FIG. 12 illustrates information that may be included in a camera/lens profile for each camera/lens combination according to some embodiments. A camera/lens profile may include information that may be used, for example, to match camera/lens profile to image metadata. This information may include one or more of but not limited to the camera make/model, the camera serial number, the camera image sampling resolution, the lens make/model, known lens characteristics such as focal length, focal distance, F number, aperture information, lens type (e.g., fisheye, wide-angle, telephoto, etc.), etc., exposure information, and known sensor/captured image characteristics (dimensions, pixel density, etc.). This information may include attributes extracted from image metadata provided by a camera/lens combination, for example from an image captured during a calibration process. A camera/lens profile may also include information that may be generated for and retrieved from the camera/lens profile for various image processing techniques. This information may have been generated in a calibration process or may be generated from other information in the image metadata provided by a camera/lens combination. This information may include one or more of, but is not limited to, vignette model parameters, lens distortion model parameters such as fisheye model parameters, chromatic aberration model parameters, sensor noise model parameters, camera sensor response curve, and camera sensor format factor.

In some embodiments, the camera/lens profiles may be formatted and stored according to a markup language in a markup language file or files. An exemplary markup language that may be used in one embodiment is eXtensible Markup Language (XML). Other markup languages or other data/file formats may be used in other embodiments. FIG. 7 shows an exemplary camera/lens profile in XML format for a single camera/lens, according to one embodiment.

In some embodiments, information obtained from the image metadata may be used in determining other characteristics of the camera, lens, camera/lens combination, and/or conditions under which an image or images were captured. These other characteristics may be used in a multi-image processing workflow. In some cases, a determined characteristic may be stored in an appropriate camera/lens profile. For example, cameras do not generally store the sensor format factor (which may also be referred to as the crop factor or focal length multiplier) in digital image metadata. In some embodiments, other attributes that may be included in digital image metadata may be used to derive, calculate, or estimate the sensor format factor for a camera used to capture the image. The sensor format factor may then be used in a multi-image processing workflow and/or may be stored in an appropriate camera/lens profile or profiles. An exemplary method for determining the sensor format factor from the image metadata is further described below.

Determining the Sensor Format Factor

In some embodiments, one of multiple techniques may be applied to determine the sensor format factor from information in the image metadata. Information from the image metadata may be used to identify which of these multiple techniques to use. For example, the camera make and model may be used to determine a particular technique to use. As another example, the presence or absence of particular attributes or values for the particular attributes may be used in determining a particular technique to use.

In one technique for calculating the sensor format factor, using EXIF as an example, a focal plane image width may be computed from the EXIF tag "ImageWidth" (in pixels) and the EXIF tag "FocalPlaneXResolution" (in DPI, dots per inch). Similarly a focal plane image height may be computed from the EXIF tag ImageLength (in pixels) and the EXIF tag FocalPlaneYResolution (in DPI, dots per inch). The dimensions of 35 mm film are 36 mm (width) and 24 mm (height), yielding a 3:2 aspect ratio. The sensor format factor is a ratio of the diagonal of 35 mm film to the diagonal of the sensor. If the computed focal plane image width and focal plane image height are valid (e.g., if the computed values are both greater than zero; zero indicates the values are not set and thus the metadata fields are not available from the input image metadata), then the sensor format factor may be computed thusly:

$$\text{sensor format factor} = \sqrt{\frac{(24)^2 + (36)^2}{(\text{focal plane image height})^2 + (\text{focal plane image width})^2}}$$

In another technique, again using EXIF as an example, the sensor format factor may be computed from the EXIF attributes or tags FocalLength and FocalLengthIn35mmFilm. In this technique, if both Focal-Length and FocalLengthIn35mmFilm are valid (e.g., if the values of both are greater than zero; zero indicates the values are not set and thus the metadata fields are not available from the input image metadata), then the sensor format factor may be estimated thusly:

$$\text{sensor format factor} = \frac{FocalLengthIn35 \text{ mm Film}}{FocalLength}$$

However, the sensor format factor estimated by this technique may not provide sufficient accuracy for all camera makes/models. Thus, in one embodiment of the technique, the sensor format factor may be clipped to a more correct theoretical value. The following is pseudocode representing an exemplary method that may be used to clip the estimated sensor format factor:

```
if ( abs(sensor format factor − 1.0) <= 0.25 OR abs(sensor format
factor − 1.5) <= 0.25)
    // sensor format factor is close to 1.0 or 1.5
    if ( abs(sensor format factor − 1.0) < abs(sensor format factor − 1.5))
        sensor format factor = 1.0;   // close to the full frame camera
    else
        sensor format factor = 1.5;
```

In one embodiment, if the one or more techniques for calculating the sensor format factor are not applicable, e.g. if the metadata tags are not present or if the values of the tags are not valid (e.g., 0), then the method may attempt to assign a default value to the sensor format factor based on the camera make.

Figure 21:
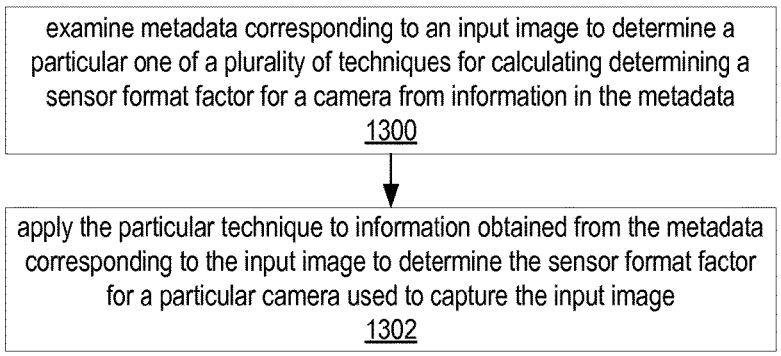
FIG. 21 is a flowchart of a method for determining a sensor format factors from image metadata, according to some embodiments.

FIG. 21 is a flowchart of a method for determining a sensor format factors from image metadata, according to some embodiments. As indicated at 1300, metadata corresponding to an input image may be examined to determine a particular one of a plurality of techniques for determining a sensor format factor for a camera from information in the metadata. In one embodiment, a profile database may be searched according to camera make and camera model information in the metadata to determine if a sensor format factor for the camera is stored in the profile database. If the sensor format factor for the camera is not stored in the profile database, other information in the metadata may be examined to determine a particular technique from among the plurality of techniques. In one embodiment, the plurality of techniques may include, but is not limited to: a technique that determines the sensor format factor from dimensions of 35 mm film and dimensions of a sensor region used to capture the image; a technique that determines the sensor format factor from focal length of the lens used to capture the image and focal length in 35 mm film of the lens used to capture the image; and a technique that assigns a default value to the sensor format factor based on camera make as determined from the metadata.

In one embodiment, to search the profile database according to camera make and camera model information in the metadata to determine if a sensor format factor for the camera is stored in the profile database, the method may determine the camera make and camera model of the particular camera from the metadata. The method may then attempt to match the camera make and the camera model from the metadata to information stored in a profile in the profile database. If a match is found and if the profile includes a sensor format factor for the camera make and the camera model, the method may assign the sensor format factor from the matched profile to the sensor format factor for the particular camera used to capture the input image.

As indicated at 1302, the particular technique may then be applied to information obtained from the metadata corresponding to the input image to determine the sensor format factor for a particular camera used to capture the input image.

The determined sensor format factor may be used to adjust or scale data in a camera/lens profile. For example, a particular profile that best matches the metadata corresponding to the image may be located in a profile database. Data specific to a particular camera/lens combination indicated by the particular profile may be retrieved from the profile; the data may then be adjusted or scaled according to the determined sensor format factor.

Matching Images to Camera/Lens Profiles

In embodiments, the image metadata may be used to match input images against a camera/lens profile database. For example, camera make and model information and/or lens make and model information may be retrieved from the image metadata corresponding to an input image and used to locate a matching or best match camera/lens profile in the camera/lens profile database. Additional custom camera data may then be retrieved from the located camera/lens profile to do processing that may be optimized for the specific camera and lens that captured the images, and in some cases for particular camera settings. The custom camera data retrieved from the database may include, but is not limited to: lens distortion data such as a fisheye distortion model, camera sensor response curve, vignette model, chromatic aberration model, intrinsic camera parameters, sensor noise model, and so on.

As an example, the image metadata may be used to determine that the input images were captured using a camera/lens combination that produces images with a significant amount of distortion, for example a camera/lens combination in which the lens is a fisheye lens. Custom camera data, for example a set of parameter values for a distortion model generated through a calibration process, may be retrieved from the database to align and unwarp the input images that is optimized for the specific camera and lens that took the pictures. FIGS. 3 through 9 and the description thereof more fully describes this example.

Figure 22:
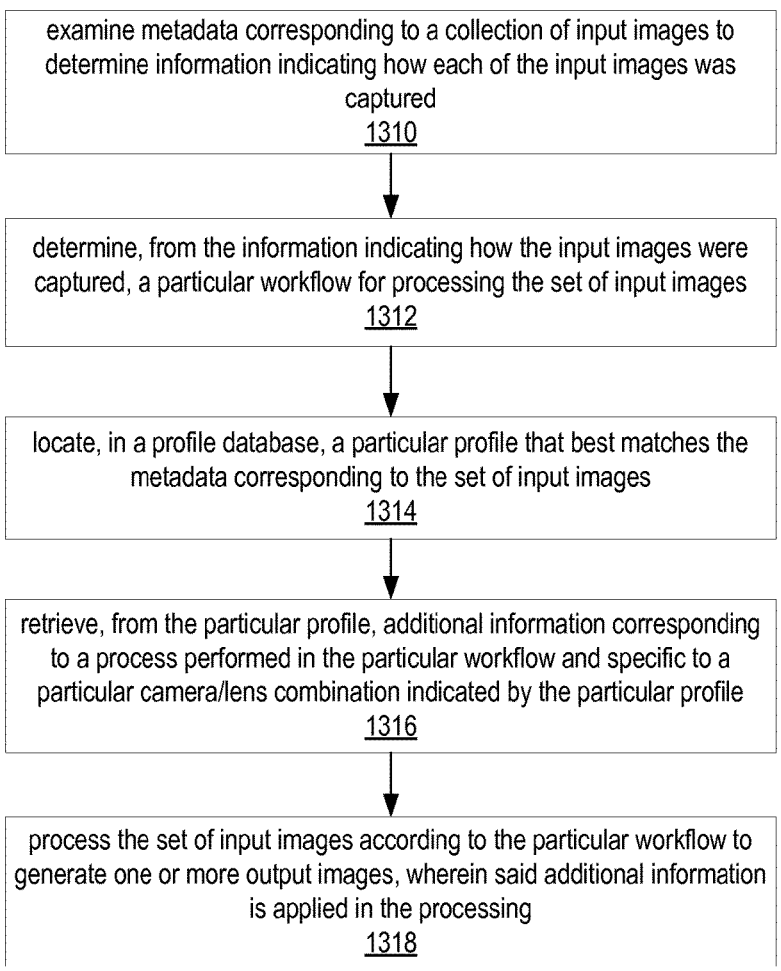
FIG. 22 is a flowchart of a method for matching image metadata to a profile database to determine image processing parameters, according to some embodiments.

FIG. 22 is a flowchart of a method for matching image metadata to a profile database to determine image processing parameters, according to some embodiments. As indicated at 1310, metadata corresponding to a set of input images may be examined to determine information indicating how the input images were captured. As indicated at 1312, a particular workflow for processing the set of input images may be determined from the information indicating how the input images were captured.

As indicated at 1314, a particular profile that best matches the metadata corresponding to the set of input images may be located in a profile database. In one embodiment, to locate a particular profile that best matches the metadata corresponding to the set of input images in the profile database, the method may determine a particular type of lens that was used to capture the set of input images from the metadata, and then search the profile database to locate the particular profile for the type of lens. The particular profile includes information corresponding to the particular type of lens that was used to capture the set of input images. In one embodiment, to locate a particular profile that best matches the metadata corresponding to the set of input images in the profile database, the method may determine a particular type of lens and a particular type of camera that were used to capture the set of input images from the metadata, and search the profile database to locate a profile that includes lens information identifying the particular type of lens used to capture the set of component images.

In one embodiment, the profile database may have been previously generated via a calibration process applied to each of a plurality of camera/lens combinations to generate calibration information for the camera/lens combination. The calibration information generated by the calibration process for each camera/lens combination is stored in a respective profile in the profile database. In one embodiment, at least a portion of image metadata from an image captured during the calibration process is stored in a respective profile in the profile database.

In one embodiment, each profile in the profile database may include information identifying a particular make and model of a respective lens and information indicating one or more optical properties of the respective lens. In one embodiment, each profile in the profile database may include information identifying a particular make and model of a respective camera and information indicating one or more properties of the respective camera. In one embodiment, each profile in the profile database may include information corresponding to each of one or more processes that may be performed in one or more workflows and specific to a particular camera/lens combination indicated by the profile. In one embodiment, the information stored in a particular profile may include calibration information for a particular type of lens that was used to capture the input images. In one embodiment, each profile in the profile database comprises information for a particular camera/lens combination, including but not limited to: lens information identifying a particular type of lens and indicating one or more optical properties of the type of lens; camera information identifying a particular type of camera and indicating one or more properties of the type of camera; and calibration information for the particular camera/lens combination.

As indicated at 1316, additional information corresponding to a process performed in the particular workflow and specific to a particular camera/lens combination indicated by the particular profile may be retrieved from the particular profile. As indicated at 1318, the set of input images may then be processed according to the particular workflow to generate one or more output images, with the additional information applied as needed during the workflow processing.

In one embodiment, the particular workflow may include a vignette removal process, and the additional information may include one or more parameters used in a vignette model applied during the vignette removal process. In one embodiment, the particular workflow may include a lens distortion removal process, and the additional information may include one or more parameters used in a lens distortion model applied during the lens distortion removal process. In one embodiment, the particular workflow may include a fisheye distortion removal process, which is an example of one type of lens distortion removal, and the additional information may include one or more parameters used in a fisheye distortion model applied during the fisheye distortion removal process. In one embodiment, the particular workflow may include a chromatic aberration removal process, and the additional information may include one or more parameters used in a chromatic aberration model applied during the chromatic aberration removal process. In one embodiment, the particular workflow may include a sensor noise removal process, and the additional information may include one or more parameters used in a sensor noise model applied during the sensor noise removal process. Note that a workflow may include multiple processes, and the additional information may include data for two or more of the processes in the workflow.

In some cases, the located profile may include camera information identifying a different type of camera than the type of camera that was used to capture the set of input images. In these cases, in some embodiments, the method may adjust or scale the additional information to account for the different type of camera. In one embodiment, to adjust the additional information to account for the different type of camera, a sensor format factor for the different type of camera may be determined, and the additional information may then be scaled according to the sensor format factor. In some cases, the set of input images may have been captured at a different image sampling resolution than an image sampling resolution indicated in the located profile. In one embodiment, the additional information may be adjusted or scaled to account for the different sampling resolution.

As previously noted, the camera/lens profiles in the camera/lens profile database may be generated via a calibration process applied to various camera/lens combination. However, there are many possible camera/lens combinations, and it may not be practical to calibrate every possible combination. Thus, in some embodiments, a scaling factor or factors may be included in at least some camera/lens profiles, or alternatively may be calculated when needed, that may be used to scale data in a camera/lens profile for a particular camera/lens combination for use with a different camera/lens combination in which the same lens is used with a different camera body, and for which there is no camera/lens profile that exactly matches the camera/lens combination. In some embodiments, data in a camera/lens profile may be scaled by the image width and/or height, or by some other applicable method, to make the data image sampling resolution-independent. This may make the camera profiles portable across the same camera models and possibly at different image sampling resolution settings. In some embodiments, the sensor format factor may be used as a scaling factor. This allows calibration data for the same model of lens determined using one camera body to be scaled for different camera bodies and for different image sampling resolutions, even for the same camera at different image sampling resolutions, and thus it may not be necessary to calibrate every combination of camera body and lens and for every possible image sampling resolution.

Constraining Solution Sets

As another example of the application of image metadata in multi-image processing, in some embodiments, the metadata may be used to constrain image processing solutions. Many image processing algorithms can be considered and implemented as optimization problems over a given solution space. Typically, the solution is not unique. Embodiments may use the metadata for a set of images to constrain the solution to a smaller solution space for the set of images, thus achieving better results and in some cases reducing processing expense and time.

As an example of using image metadata to constrain image processing solutions, in a geometric lens distortion correction process, if it is determined that the input images are taken with the same camera, lens and focal length, then a constraint that the computed lens distortion model must be identical across multiple input images may be enforced. This constraint may result in a more robust solution in this case.

As another example of using image metadata to constrain image processing solutions, in one embodiment, if an image processing technique requires N parameters to be estimated for each input image, and if it is determined from the metadata for a set of M input images to be processed by the technique that the images were taken with the same camera/lens combination and under the same or similar conditions and/or settings (e.g., focal length, focal distance, exposure, etc.), then, instead of estimating the N parameters for each of the images in the set, thus requiring the estimation of M×N parameters, the N parameters may be estimated once from data in all images in the set of images and then the common set of N parameters may be applied to the M images. As an alternative, the parameters may be estimated for a subset of one or more of the input images and then applied to the M images. This reduces the problem from an M×N variable problem to an N variable problem.

Figure 23:
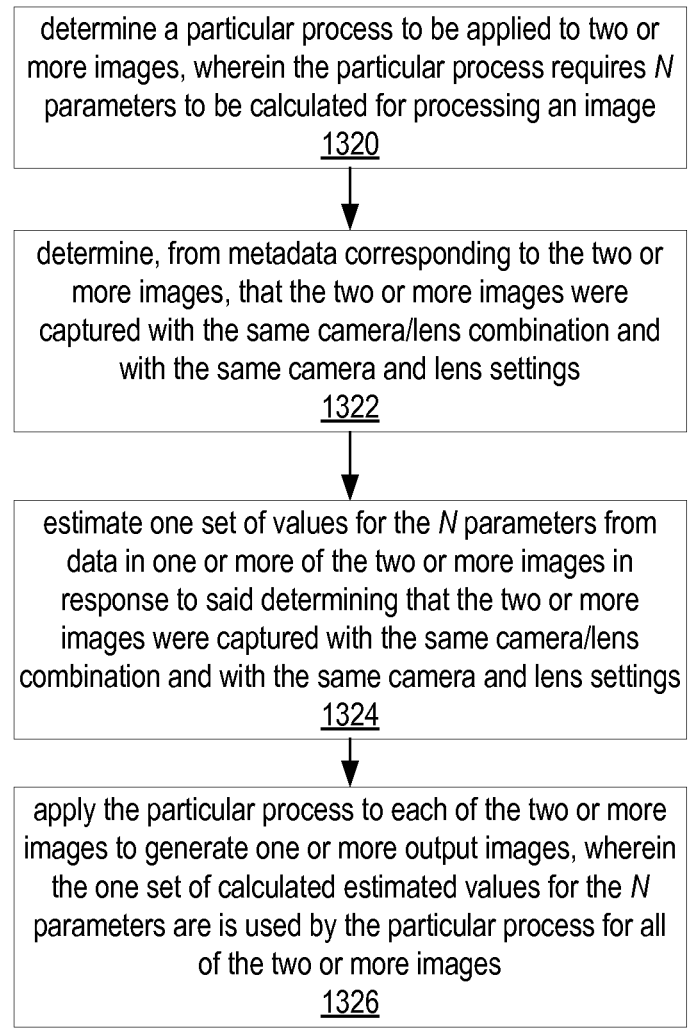
FIG. 23 is a flowchart of a method for constraining solution space in an image processing technique, according to some embodiments.

FIG. 23 is a flowchart of a method for constraining solution space in an image processing technique, according to some embodiments. As indicated at 1320, a particular process that is to be applied to two or more images and that requires N parameters to be calculated for processing an image may be determined, for example by examining metadata corresponding to the two or more images. As indicated at 1322, a determination may be made from the metadata that the two or more images were captured with the same camera/lens combination and with the same camera and lens settings. As indicated at 1324, a set of values may be estimated for the N parameters from data in one or more of the two or more images in response to determining that the two or more images were captured with the same camera/lens combination and with the same camera and lens settings. As indicated at 1326, the particular process may then be applied to each of the two or more images to generate one or more output images; the one set of calculated estimated values for the N parameters is used by the particular process for all of the two or more images.

In one embodiment, the particular process is a vignette removal process, and the N parameters include one or more parameters used in a vignette model applied during the vignette removal process. In one embodiment, the particular process is a lens distortion removal process such as a fisheye distortion removal process, and the N parameters include one or more parameters used in a lens distortion model applied during the lens distortion removal process. In one embodiment, the particular process is a chromatic aberration removal process, and the N parameters include one or more parameters used in a chromatic aberration model applied during the chromatic aberration removal process. In one embodiment, the particular process is a sensor noise removal process, and the N parameters include one or more parameters used in a sensor noise model applied during the sensor noise removal process.

As yet another example of using image metadata to constrain image processing solutions, in a vignette removal process, the exposure values from the image metadata may be used to validate exposure values estimated in the process. Vignetting is a known effect or distortion that may be seen in at least some captured images, caused by the optical characteristics of camera lenses, in which the center of the captured image is brighter and, moving away from the center, the brightness falls off; thus, the edges of the captured image may be darker than the center. In a vignette removal process, exposure values may be estimated from the actual image content of an image or images (i.e., from the image pixel information). In one embodiment, if the estimated exposure values deviate too far from the exposure values read from the metadata, i.e. if the difference between an estimated exposure value and an exposure value read from metadata is above or below a specified or calculated threshold, then the exposure values from the image metadata may be substituted in as the default values used to, for example, drive the estimation of other variables in the vignette removal process.

Figure 24:
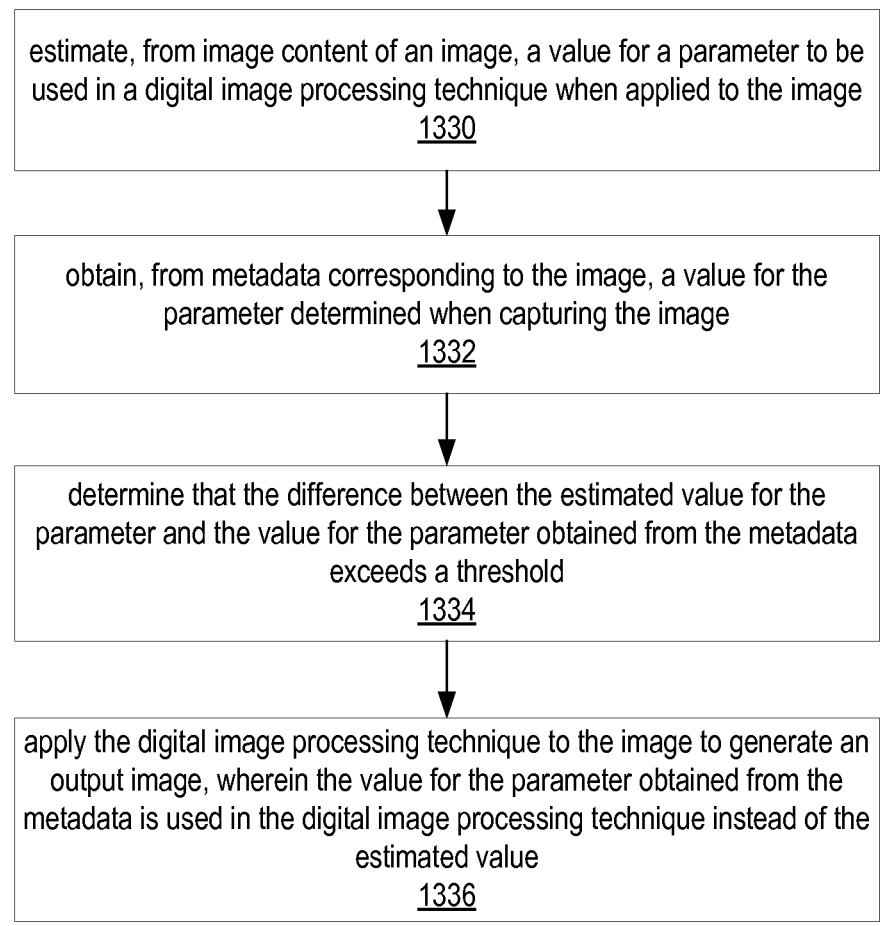
FIG. 24 is a flowchart of a method for constraining solution space in an image processing technique, according to some embodiments.

FIG. 24 is a flowchart of a method for constraining solution space in an image processing technique, according to some embodiments. As indicated at 1330, a value for a parameter to be used in a digital image processing technique when applied to an image may be estimated, for example from image content of the image. As indicated at 1332, a value for the parameter, determined when capturing the image, may be obtained from metadata corresponding to the image. As indicated at 1334, a determination may be made that the difference between the estimated value for the parameter and the value for the parameter obtained from the metadata exceeds a threshold. As indicated at 1334, the digital image processing technique may be applied to the image to generate an output image, with the value for the parameter obtained from the metadata used in the digital image processing technique instead of the estimated value in response to determining that the difference exceeds the threshold.

In one embodiment, the digital image processing technique is a vignette removal process, and the parameter is exposure.

Figure 10:
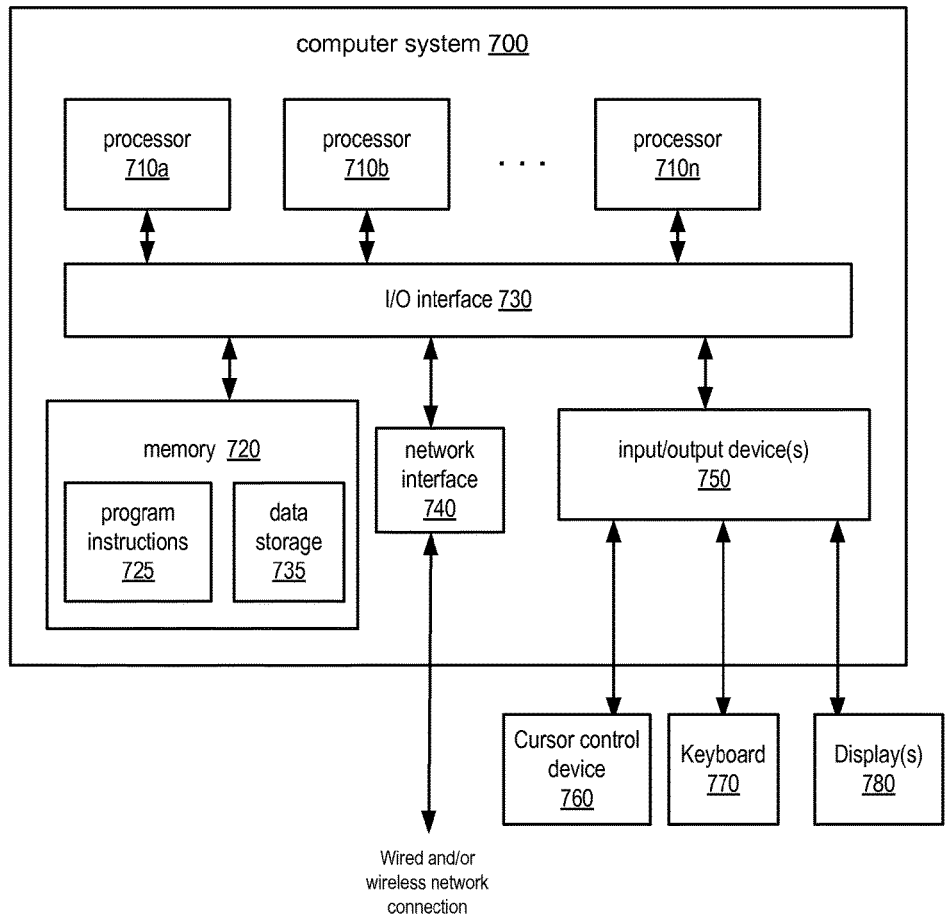
FIG. 10 illustrates an exemplary computer system that may be used in embodiments.
Figure 13:
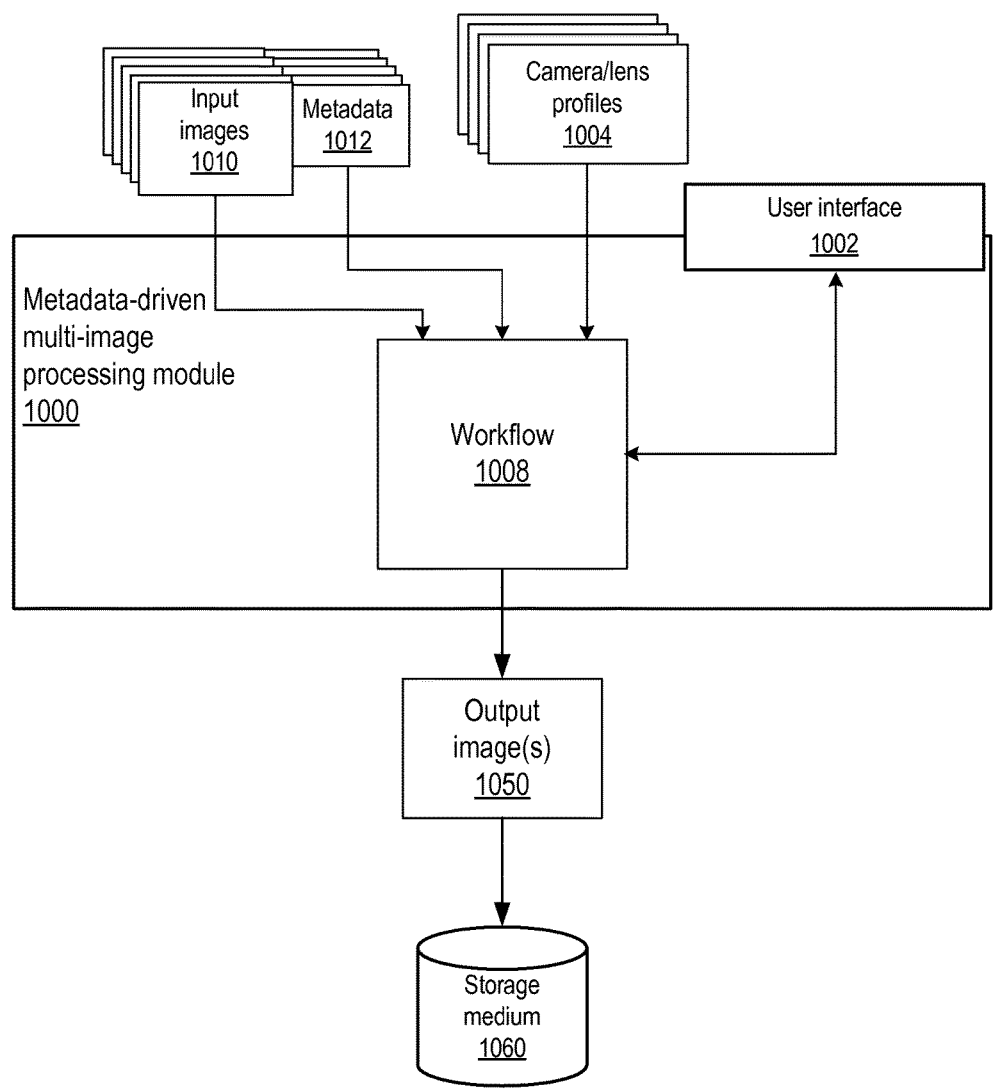
FIG. 13 illustrates a metadata-driven multi-image processing method implemented as a module, and shows input and output to the module, according to one embodiment.

FIG. 13 illustrates a metadata-driven multi-image processing method implemented as a module, and shows input and output to the module, according to one embodiment. Metadata-driven multi-image processing module 1000 or components thereof may be instantiated on one or more computer systems, which may interact with various other devices. One such computer system is illustrated by FIG. 10. Metadata-driven multi-image processing module 1000 receives as input a set of input images 1010 and the metadata 1012 corresponding to the images. Examples of input images 1010 may include, but are not limited to, a set of component images taken of a scene to be stitched into a composite panoramic image, a set of component images taken of a scene at different exposures to be rendered into a high dynamic range (HDR) image, and a set of time-lapse images taken of a scene from which an image is to be generated. As another example, input images 1010 may include a set or sets of digital images captured as a video by a digital camera such as a DSLR (digital single lens reflex) camera in video mode. In some embodiments, metadata-driven multi-image processing module 1000 may also receive or have access to predetermined camera/lens profiles 1004, for example stored in a camera/lens profile database or databases. Metadata-driven multi-image processing module 1000 generates, or renders, from at least a subset of input images 1010, one or more output images 1050, with each output image being some combination of two or more of input images 1010. To render an output image 1050, metadata-driven multi-image processing module 1000 may apply an automated or an interactive workflow 1008 including one or more image or multi-image processing steps to the input images 1010. Metadata 1012 may be used in various ways in directing and performing one or more of the processing steps of the workflow 1008. For example, in some cases, metadata 1012 may be used to locate and retrieve specific information stored in camera/lens profiles 1004 that may be used in processing the set of, or subset(s) of, input images 1010.

Examples of an output image 1050 may include, but are not limited to, a composite image generated by a panoramic image stitching process, a high dynamic range (HDR) image generated from two or more images by an HDR image generation process, an output image rendered from two or more input images with moving objects removed or reduced via time-lapse image processing, as well as output images produced via other image processing techniques. In addition, two or more of a panoramic image stitching process, an HDR image generation process, time-lapse image processing, or other image processing techniques may be applied to a set of input images to generate an output image 1050. An output image 1050 may, for example, be stored to a storage medium 1060, such as system memory, a disk drive, DVD, CD, etc., printed to a printing device (not shown), displayed to a display device (not shown), and/or transmitted via a transmission medium (not shown).

Some embodiments may provide a user interface 1002 that provides one or more user interface elements that enable a user to, for example, specify input images 1010 and specify or select a format, a processing workflow, or other information or instructions for the multi-image processing and/or for output image 1050. In one embodiment, user interface 1002 may allow a user to accept, reject, or override a default behavior. For example, user interface 1002 may provide one or more user interface elements that enable a user to override a workflow process selected for a set or subset of images 1010 according to metadata 1012. Overriding may include the user specifying a different workflow process for a set or subset of images 1010 via the user interface. As another example, the user interface may allow a user to identify a custom camera/lens profile, for example when metadata 1012 is unavailable or inadequately identifies the camera/lens combination. In some embodiments, user interface 1002 may provide one or more user interface elements that may be used to indicate to a user information determined for a set of images 1010 from metadata 1012, to indicate to a user recommendations for better image captured techniques as determined from metadata 1012 for a set of images captured by the user, and generally to provide information to intelligently guide the user through a multi-image processing workflow depending on the metadata 1012 for the input images 1012.

Figure 25:
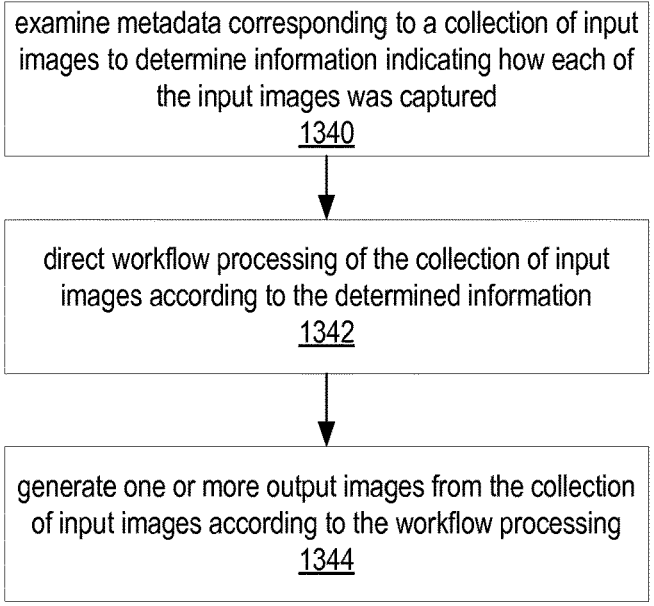
FIG. 25 is a flowchart of a metadata-driven method for multi-image processing, according to some embodiments.

FIG. 25 is a flowchart of a metadata-driven method for multi-image processing, according to some embodiments. As indicated at 1340, metadata corresponding to a collection of input images may be examined to determine information indicating how each of the input images was captured.

In one embodiment, the information indicating how each of the input images was captured may include camera make, camera model, and one or more lens characteristics. In one embodiment, the one or more lens characteristics may include focal length, F number, and lens type. In one embodiment, the information indicating how each of the input images was captured may include indications of one or more conditions under which each of the input images was captured. In one embodiment, the information indicating how each of the input images was captured may include indications of particular camera and lens settings used when capturing the input images. In one embodiment, the information indicating how each of the input images was captured may include one or more characteristics of the camera, the lens, or the camera/lens combination. In one embodiment, the information indicating how each of the input images was captured may include geospatial information. In one embodiment, the information indicating how each of the input images was captured may include GPS (Global Positioning System) information. In one embodiment, the information indicating how each of the input images was captured may include camera orientation information. The information indicating how each of the input images was captured may include other information or data not mentioned.

As indicated at 1342, workflow processing of the collection of input images may be directed according to the information from the metadata. As indicated at 1344, one or more output images may be generated or rendered from the collection of input images according to the workflow processing.

In one embodiment, the workflow processing may include two or more different workflows, and directing workflow processing of the collection of input images according to the determined information may include determining, from the information indicating how each of the input images was captured, an appropriate one of the two or more workflows for at least a portion of the collection of input images, and processing the at least a portion of the collection of input images according to the determined workflow.

In one embodiment, the workflow processing may include two or more different workflows, and directing workflow processing of the collection of input images according to the determined information may include determining, from the information indicating how each of the input images was captured, a recommended workflow from the two or more workflows for at least a portion of the collection of input images, displaying the recommended workflow for the at least a portion of the collection of input images, and receiving user input accepting or rejecting the recommended workflow. If the recommended workflow is accepted, the method may process the at least a portion of the collection of input images according to the recommended workflow.

In one embodiment, directing workflow processing of the collection of input images according to the determined information may include retrieving additional information about a particular camera/lens combination from a profile database, wherein at least a portion of the determined information from the metadata is used to locate the particular camera/lens combination in the profile database, and applying the additional information during the workflow processing of at least a subset of the collection of input images captured with the particular camera/lens combination.

In one embodiment, metadata may be used in a metadata-driven multi-image processing module 1000 to sort a collection of potentially arbitrarily mixed input images 1010 into processing or workflow categories, referred to herein as buckets. The sorted images may then be processed by two or more different workflows according to the buckets into which the images are sorted. Input images 1010 may include, but are not limited to, set(s) of component images taken of a scene to be stitched into a composite panoramic image, set(s) of component images taken of a scene at different exposures to be rendered into a high dynamic range (HDR) image, and/or set(s) of time-lapse images taken of a scene from which an image of the scene is to be generated, or combinations thereof. As another example, input images 1010 may include a set or sets of digital images captured as a video by a digital camera such as a DSLR (digital single lens reflex) camera in video mode. Furthermore, input images 1010 may include images captured using different camera/lens combinations, images captured under various conditions and camera settings and at different times, and images captured by different photographers.

Figure 26:
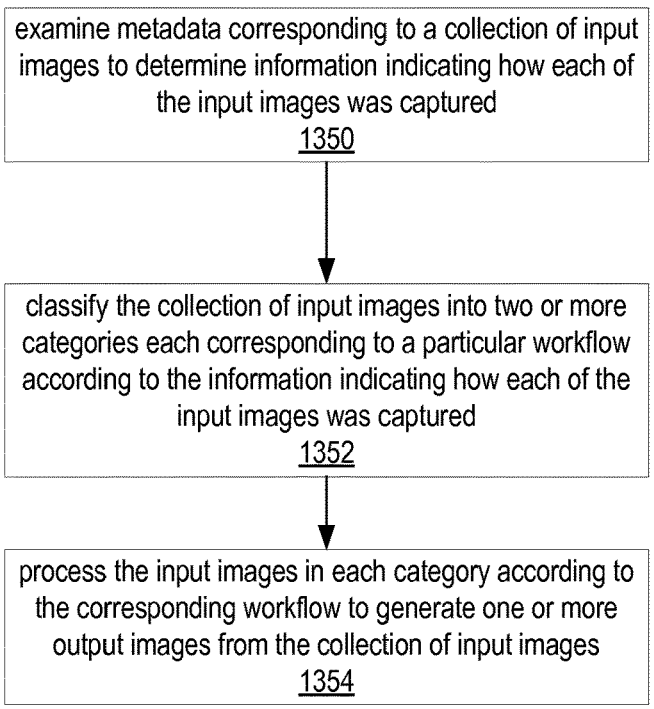
FIG. 26 is a flowchart of a metadata-driven method for categorizing a collection of input images into different workflows, according to some embodiments.

FIG. 26 is a flowchart of a metadata-driven method for categorizing a collection of input images into different workflows, according to some embodiments. As indicated at 1350, metadata corresponding to a collection of input images may be examined to determine information indicating how each of the input images was captured. As indicated at 1352, the collection of input images may be classified into two or more categories (or buckets) according to the information indicating how each of the input images was captured. Each category corresponds to a particular one of the two or more workflows. As indicated at 1354, the input images in each category may be processed according to the corresponding workflow.

Figure 14:
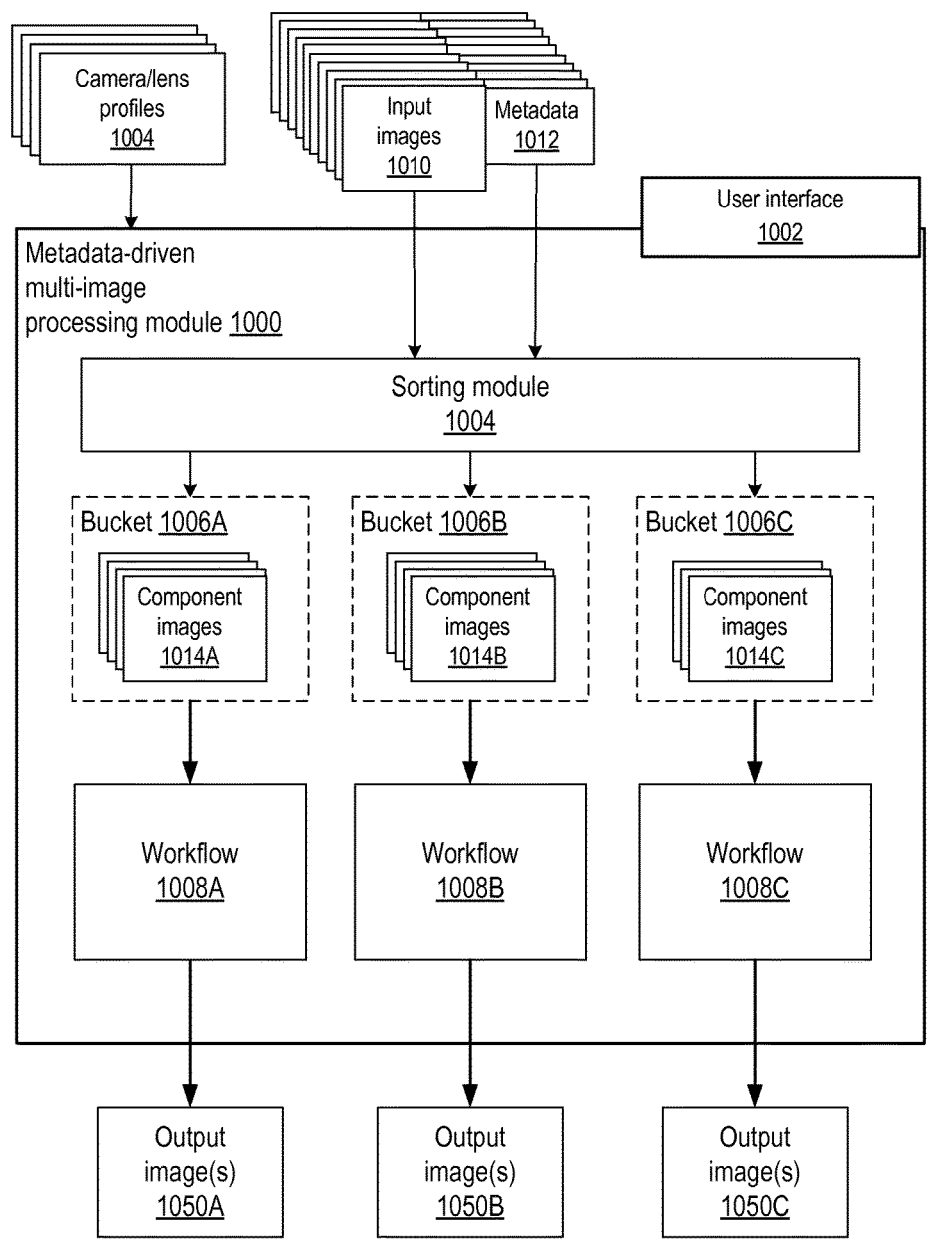
FIG. 14 illustrates a metadata-driven multi-image processing module that sorts input images into buckets and processes the images accordingly, according to one embodiment.

FIG. 14 illustrates a metadata-driven multi-image processing module that sorts input images into buckets and processes the images accordingly, according to one embodiment. Metadata-driven multi-image processing module 1000 receives as input a batch or stream of input images 1010 and the metadata 1012 corresponding to the images. A sorting component, process or module 1004 may sort the input images 1010 into two or more processing or workflow buckets 1006 according to information in the metadata 1012 corresponding to the images 1010. In one embodiment, in addition to sorting the images 1010 into different buckets 1006, sorting module 1004 may also identify and group images 1010 into sets of component images 1014 within each bucket 1006 according to information in the metadata 1012 corresponding to the images 1010. For example, an identified and grouped set of component images 1014 may be all the images 1010 captured in a particular panoramic image shoot of a scene from which a composite panoramic image of the scene is to be generated, all the images taken by a photographer of a particular scene from which an HDR image of the scene is to be generated, all the time-lapse images taken by a photographer of a particular scene to which time-lapse processing is to be applied in generating an image of the scene, or a set or sets of digital images captured as a video by a digital camera such as a DSLR (digital single lens reflex) camera in video mode. In some embodiments, sorting module 1004 may not rely solely on the metadata to do the sorting. In some embodiments, sorting module 1004 may invoke other additional image processing steps. For example, in one embodiment, to further confirm the assignment of images to a time-lapse bucket or HDR bucket, a multiview panorama algorithm may be invoked on an image set to confirm that there is not much spatial movement among the images.

In an alternative embodiment, instead of sorting module 1004 identifying and grouping images 1010 into sets of component images 1014 within each bucket 1006, sorting module 1004 may only sort the images 1010 into buckets 1006. Each workflow 1008 may then be responsible for identifying and selecting sets of component images from the bucket to be processed according to information in the metadata 1012 corresponding to the component images 1014 in the respective bucket 1006.

It is possible that sorting module 1004 may encounter some input images 1010 which it cannot categorize into a bucket 1006 for a particular workflow 1008. While not shown in FIG. 14, in one embodiment, sorting module 1004 may place these uncategorized input images into an "unknown" or "unspecified" bucket. In one embodiment, metadata-driven multi-image processing module 1000 may enable or request a user to classify these uncategorized input images. For example, the user may be prompted to group these images, if possible, and to specify a workflow process or type of image processing that is to be applied to these images, if any. In some embodiments, metadata-driven multi-image processing module 1000 may make suggestions as to a recommended workflow or type of image processing that may be applicable to one or more of these unclassified images based upon what the metadata-driven multi-image processing module 1000 could determine about these images 1010 from the respective metadata 1012.

The sorted component images 1014A, 1014B, and 1014C may then be processed by different workflows 1008A, 1008B, and 1008C, respectively, according to the buckets 1006 into which the component images 1014 are sorted. For example, workflow 1008A may be a panoramic image stitching workflow, workflow 1008B may be an HDR image generation workflow, and workflow 1008C may be a time-lapse image processing workflow. For these exemplary workflows, each workflow 1008 generates, or renders, from component images 1014 in a corresponding bucket 1006, one or more output images 1050, with each output image 1050 being a combination or composite of two or more of component images 1014 generated or rendered by the particular workflow 1008. As another example, a workflow may be configured to apply one or more digital image processing techniques, such as vignette removal, distortion removal, brightness adjustment, color adjustment, filtering, smoothing, noise reduction, or in general any applicable digital image processing technique, to each image in a set or sets of digital images captured as a video by a digital camera such as a DSLR (digital single lens reflex) camera in video mode.

While the above generally describes sorting or classifying input images 1010 into buckets 1006 that correspond to workflows 1008 for processing groups of two or more component images 1014 to generate or render output images 1050 from the component images 1014, in some embodiments, sorting module 1004 may classify individual input images 1010 into a bucket or buckets 1006 that correspond to workflow(s) or process(es) that may be applied to individual images. For example, a workflow 1008 may be an automated or interactive digital image processing workflow that applies one or more image processing techniques, such as vignette removal, distortion removal, brightness adjustment, color adjustment, filtering, smoothing, noise reduction, or in general any applicable digital image processing technique, to a single input image.

Embodiments of a metadata-driven multi-image processing module 1000 may implement one or more workflows. Embodiments of a metadata-driven multi-image processing module 1000 may provide one or more user interface elements via a user interface 1002 that may, for example, enable the user to direct the metadata-driven multi-image processing module 1000 in selecting an appropriate workflow for a set of images and in performing a workflow. For example, one embodiment of a metadata-driven multi-image processing module 1000 may automatically determine an optimal workflow for a set of input images, and may provide a user interface element or elements that allow the user to either select or override the determined optimal workflow for the set of images. Embodiments of a metadata-driven multi-image processing module 1000 may inform the user of workflow processing progress for set(s) of images.

Workflows

A workflow, as used herein, may include one or more digital image processing techniques or processes that may be applied to a digital image, to a set of related digital images, or to a collection of digital images which may include one or more individual digital images and/or one or more sets of related digital images. A workflow may itself contain one or more workflows. A workflow may be automated (performed without user interaction) or interactive (i.e., performed with at least some user interaction) or a combination thereof. A workflow that is specifically applied to a set or sets of images, such as a panoramic image stitching workflow, may be referred to as a multi-image workflow.

FIGS. 15A through 20 illustrate various exemplary multi-image processing workflows that may be implemented according to embodiments. There are various photographic techniques that may result in a photographer capturing multiple images with a digital camera/lens combination. Different techniques may require different workflow processing specific to those techniques. In addition, as illustrated in FIGS. 16 through 20, two or more of these techniques may be combined in one session by a photographer, and thus a workflow to process a set of images captured using two or more techniques may combine two or more workflows specific to the particular techniques that were used in combination to capture the set of images. Embodiments of a method and apparatus for metadata-driven processing of multiple images, for example implemented in a metadata-driven multi-image processing module 1000, may be applied to automating and/or directing these various exemplary workflows according to image metadata corresponding to the sets of images. Note that these workflows are given by way of example; other workflows are possible that may include one or more of the illustrated workflows or process, and may also include other image processing workflows or processes not illustrated or combinations thereof, and embodiments of a method and apparatus for metadata-driven processing of multiple images implemented in a metadata-driven multi-image processing module 1000 may be applied to automating and/or directing these other workflows or processes. Other image processing techniques that may be applied, alone or in combination, in the exemplary workflows or in other workflows, may include one or more of vignette removal, distortion removal, brightness adjustment, color adjustment, filtering, smoothing, noise reduction, or in general any applicable digital image processing technique.

Figure 15A:
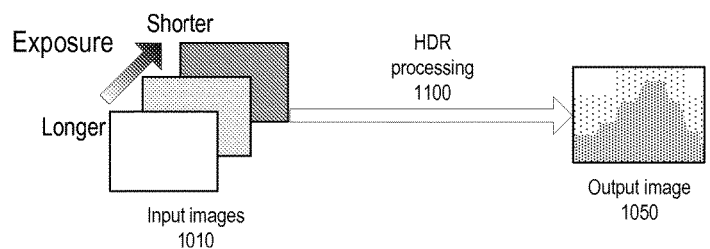
FIG. 15A illustrates a technique for generating a high dynamic range (HDR) image from multiple input 8-bit images according to some embodiments.
Figure 15B:
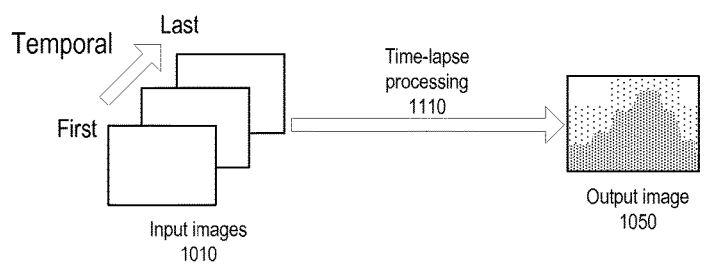
FIG. 15B illustrates a technique for generating an image from multiple time-lapse images according to some embodiments.
Figure 15C:
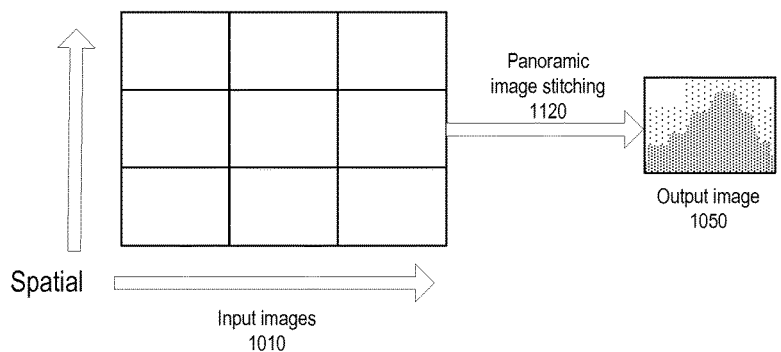
FIG. 15C illustrates a technique for generating a composite image from multiple images captured from different locations relative to the scene in a panoramic image capture technique according to some embodiments.

FIGS. 15A through 15C illustrate three exemplary photographic techniques that may be used to generate sets of multiple images and the general processing techniques that may be applied to the sets of images to generate or synthesize an image from an input set of multiple images.

FIG. 15A illustrates a technique for generating a high dynamic range (HDR) image according to some embodiments. Conventionally, digital images are captured as 8-bit images. That is, a typical image captured by a typical digital camera has 8-bit depth for each channel (e.g., for each of the red, green, and blue channels in an RGB image) of each pixel. Thus, typical captured digital images have low dynamic range; each channel has a value in the discrete range 0-255. In digital imaging, an HDR image is an image for which the pixel value is expressed and stored as a floating-point number, typically between 0.0 and 1.0. Thus, HDR images have high dynamic range. A technique for generating an HDR image using a digital camera that generates and stores conventional, 8-bit images is to capture several images of a scene each at a different exposure and then combine the multiple images to synthesize an HDR image of the scene.

For example, a photographer may shoot a static scene at a 1 second exposure, change the exposure level to 0.5 seconds, take another shot of the scene, change the exposure level to 0.25 seconds, and take another shot of the scene, thus generating three different images of the scene at different exposure levels. For darker areas of the scene, the longer exposure(s) produce better results. However, brighter areas of the scene may be saturated in the longer exposure. The shorter exposures produce better results for the brighter areas of the scene; however, the darker areas tend to be unexposed or underexposed. The goal of HDR processing 1100 is to assemble all these input images 1010 captured at different exposure levels into one image so that the resultant image 1050 has good contrast and shows good detail in brighter areas of the scene as well as in darker areas of scene, and in areas in between. Since a floating-point number is used to represent the pixel values in an HDR image, an HDR image can represent much more detail across a wide range of illumination in a scene than can conventional 8-bit images.

In various embodiments, different specific techniques may be applied by HDR processing 1100 to synthesize an HDR output image 1050 from multiple input images 1010. Generally, however, the HDR processing 1100 applies some mathematical technique that combines the 8-bit values for each channel at a particular pixel location in the input images to generate floating point values for the channels at a corresponding pixel location in the output HDR image.

In one embodiment, metadata corresponding to input images 1010 may be examined by a metadata-driven multi-image processing module 1000 to automatically determine that the input images 1010 may need to be processed by an HDR processing 1100 workflow. For example, the metadata may be examined to determine that the input images 1010 were captured by the same camera/lens combination and at the same focal length, but at different exposure levels. The presence of different exposure levels may indicate to the metadata-driven multi-image processing module 1000 that the images may need to be processed by HDR processing 1100. In one embodiment, the metadata-driven multi-image processing module 1000 may place the images into a bucket corresponding to the HDR processing 1100 workflow, as shown in FIG. 14. Alternatively, or in addition, multi-image processing module 1000 may indicate or recommend to a user via user interface 1002 that the input images 1010 may require HDR processing 1100; the user may then accept or override the recommendation of the multi-image processing module 1000. As another alternative, metadata-driven multi-image processing module 1000 may just directly feed the images 1010 as a group to HDR processing 1100 without user notification or action.

In some embodiments, information from metadata corresponding to input images 1010 may be used in HDR processing 1100 of the images 1010. In some embodiments, information from metadata corresponding to input images 1010 may be used to locate other information for the camera/lens combination in a camera/profile database, and that other information may be used in HDR processing 1100 of the images 1010. In some embodiments, information from metadata corresponding to input images 1010 may be used to derive other information by some other technique than looking the information up in a camera/lens profile database, e.g. information in the metadata may be used to derive a sensor format factor for the camera sensor, and the derived information may be used in HDR processing 1100 of the images 1010.

FIG. 15B illustrates a technique for generating an image from multiple time-lapse images according to some embodiments. For example, a photographer may shoot several images of a scene at different times, but otherwise with the same characteristics (e.g., focal length, focal distance, aperture, exposure time, etc.) The intervals between shots may be the same, or may vary. For example, a photographer may shoot two or more pictures of a scene at one-minute intervals, five-minute intervals, one-hour intervals, etc. A time-lapse processing technique 1110 may then be used to generate or synthesize one or more output images 1050 from the input images 1050.

In some embodiments, time-lapse processing technique 1110 may attempt to remove moving objects from the scene. For example, a photographer may shoot several time-lapse images of a street scene in which it is possible that one or more persons crossed the scene while the shoot was taking place. In various embodiments, different specific techniques may be applied by time-lapse processing technique 1110 to remove moving objects from input images 1010. For example, in one embodiment, a technique that takes the median value at each pixel across the images 1010 may be used to remove moving objects from the scene.

In one embodiment, metadata corresponding to input images 1010 may be examined by a metadata-driven multi-image processing module 1000 to automatically determine that the input images 1010 may need to be processed by a time-lapse processing technique 1110 workflow. For example, the metadata may be examined to determine that the input images 1010 were captured by the same camera/lens combination with the same camera/lens conditions or settings (e.g., focal length, focal distance, aperture, exposure time), but at different times. A set of images captured by the same equipment at the same settings but at different times (e.g., at a set interval) may indicate to the metadata-driven multi-image processing module 1000 that the images may need to be processed by a time-lapse processing technique. In one embodiment, the metadata-driven multi-image processing module 1000 may place the images into a bucket corresponding to the time-lapse processing 1110 workflow, as shown in FIG. 14. Alternatively, or in addition, multi-image processing module 1000 may indicate or recommend to a user via user interface 1002 that the input images 1010 may require time-lapse processing 1110; the user may then accept or override the recommendation of the multi-image processing module 1000. As another alternative, metadata-driven multi-image processing module 1000 may just directly feed the images 1010 as a group to time-lapse processing 1110 without user notification or action.

In some embodiments, information from metadata corresponding to input images 1010 may be used in time-lapse processing 1110 of the images 1010. In some embodiments, information from metadata corresponding to input images 1010 may be used to locate other information for the camera/lens combination in a camera/profile database, and that other information may be used in time-lapse processing 1110 of the images 1010. In some embodiments, information from metadata corresponding to input images 1010 may be used to derive other information by some other technique than looking the information up in a camera/lens profile database, e.g. information in the metadata may be used to derive a sensor format factor for the camera sensor, and the derived information may be used in time-lapse processing 1110 of the images 1010.

FIG. 15C illustrates a technique for generating an image from multiple images captured from different locations relative to the scene in a panoramic image capture technique according to some embodiments. For example, a photographer may shoot two or more images of a scene, moving the camera to a different location between each shot. This technique is generally used to capture a panoramic view of the scene that includes more of the scene than can be captured by a single shot, up to and including a 360° panoramic view. Note that other techniques may be used to capture the component images of a panoramic view. This panoramic image capture technique produces a set of images that are spatially arranged; for example, see the exemplary nine input images 1010 illustrated in FIG. 15C. Note that the individual component images typically overlap adjacent component image(s) by some amount. A panoramic image stitching process 1120 may then be used to render a composite output image 1050 from the input component images 1050. In various embodiments, different specific techniques may be applied by panoramic image stitching process 1120 to render a composite output image 1050 from the input component images 1050.

Figure 3:
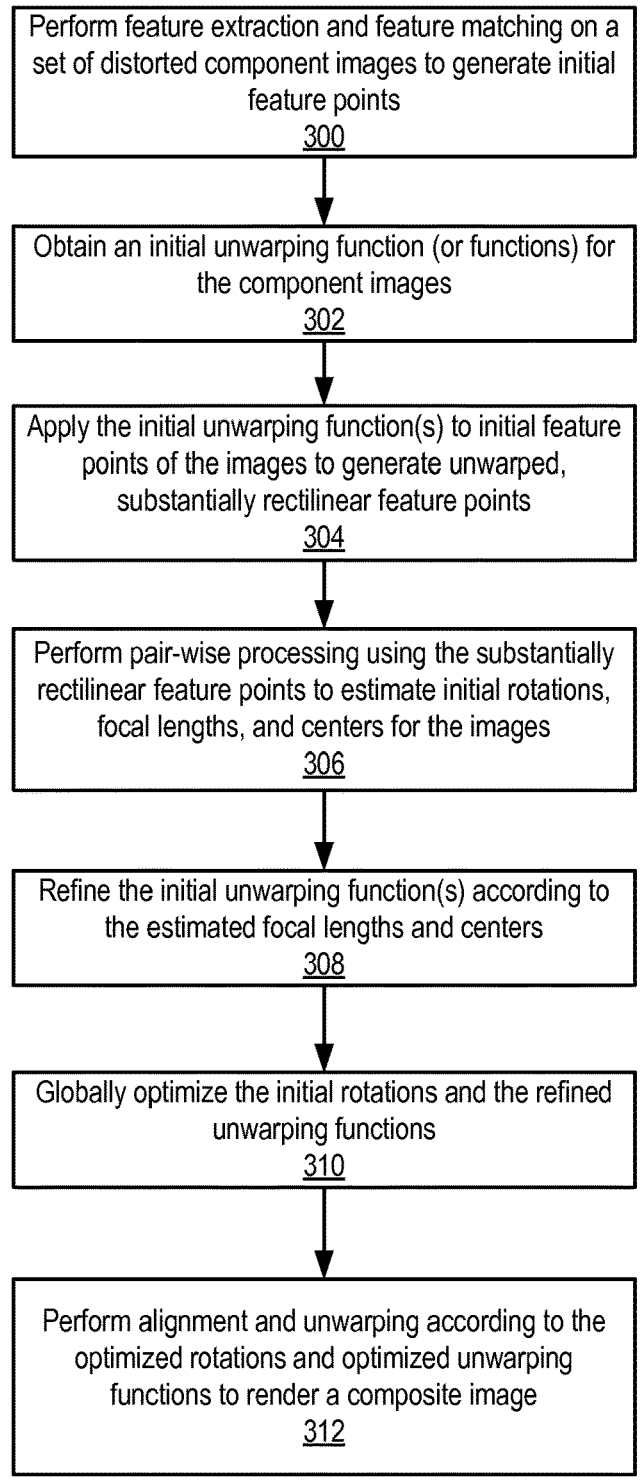
FIG. 3 is a flowchart of a method for aligning and unwarping distorted images according to one embodiment.
Figure 4:
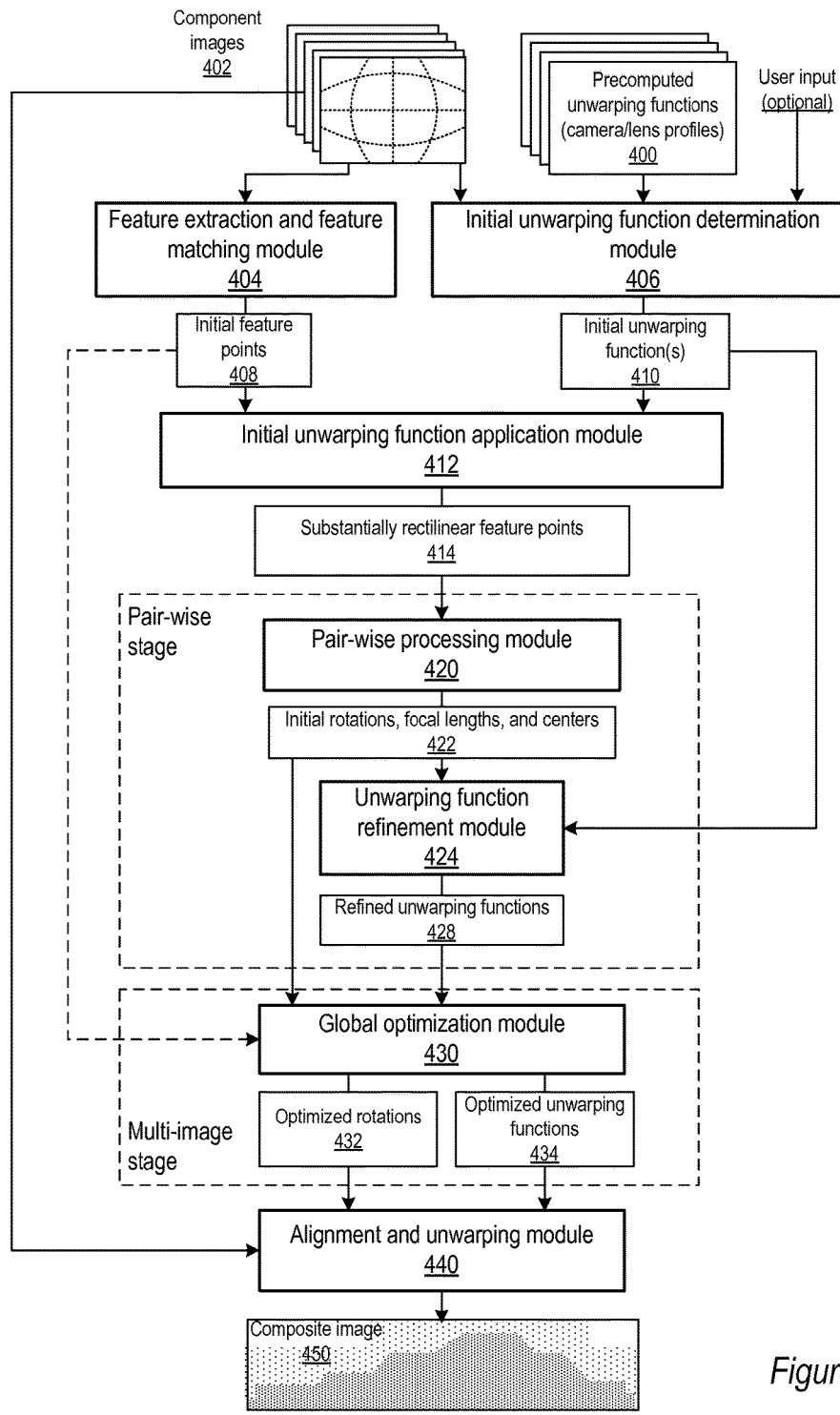
FIG. 4 is a data flow diagram of a method for aligning and unwarping distorted images according to one embodiment.

FIGS. 3 and 4 and the discussion thereof illustrate and describe an exemplary panoramic image stitching process particularly directed at aligning and unwarping distorted images, such as images captured with a fisheye lens, that may be used in some embodiments of a multi-image processing module 1000. A similar panoramic image stitching process may be used to render a composite output image from a set of component input images that are not necessarily distorted as described for the input images of FIGS. 3 and 4. A general paradigm for automatic image stitching techniques or processes that may be used in a panoramic image stitching process 1120 of some embodiments of multi-image processing module 1000 is to first detect features in individual images; second, to establish feature correspondences and geometric relationships between pairs of images (pair-wise stage); and third, to use the feature correspondences and geometric relationships between pairs of images found at the pair-wise stage to infer the geometric relationship among all the images (multi-image stage). The images are then stitched together to form a composite output image. Note that some embodiments of panoramic image stitching process 1120 may also or alternatively apply one or more other image processing techniques including, but not limited to, vignetting removal, techniques for the removal of other forms of distortion than those described, chromatic aberration removal, and noise removal to input images 1010, output image 1050, or to intermediate images (not shown).

In one embodiment, metadata corresponding to input images 1010 may be examined by a metadata-driven multi-image processing module 1000 to automatically determine that the input images 1010 may need to be processed by a panoramic image stitching process 1120 workflow. For example, the metadata may be examined to determine that the input images 1010 were captured by the same camera/lens combination with the same camera/lens conditions (e.g., focal length, focal distance, aperture, exposure time), but at different locations relative to the scene. In some embodiments, geospatial information (e.g., geotagging, GPS (Global Positioning System) information, etc.) and/or camera orientation information (e.g., tilt, direction, etc) may be included in at least some image metadata, and may be used to determine, for example, relative camera location and orientation and thus may be used in detecting images captured with a panoramic image capture technique or images captured using some other photographic technique.

As another example, the metadata may be examined to determine that the input images 1010 were captured by the same camera/lens combination with the same camera/lens conditions (e.g., focal length, aperture, exposure time), and that each image in the set of input images 1010 does not overlap or only partially overlaps other images in the set. The images in a set of images captured using either an HDR image capture technique or a time lapse image capture technique generally overlap almost completely or completely, while the images in a set of images captured using a panoramic image capture technique overlap other images in the set only partially or not at all, and thus this difference may be used in some embodiments to distinguish sets of images that need to be processed by a panoramic image stitching process 1120 workflow from images captured with an HDR image capture technique or a time lapse image capture technique.

In one embodiment, the metadata-driven multi-image processing module 1000 may place the images into a bucket corresponding to the panoramic image stitching process 1120 workflow, as shown in FIG. 14. Alternatively, or in addition, multi-image processing module 1000 may indicate or recommend to a user via user interface 1002 that the input images 1010 may require panoramic image stitching process 1120; the user may then accept or override the recommendation of the multi-image processing module 1000. As another alternative, metadata-driven multi-image processing module 1000 may just directly feed the images 1010 as a group to panoramic image stitching process 1120 without user notification or action.

Figure 27:
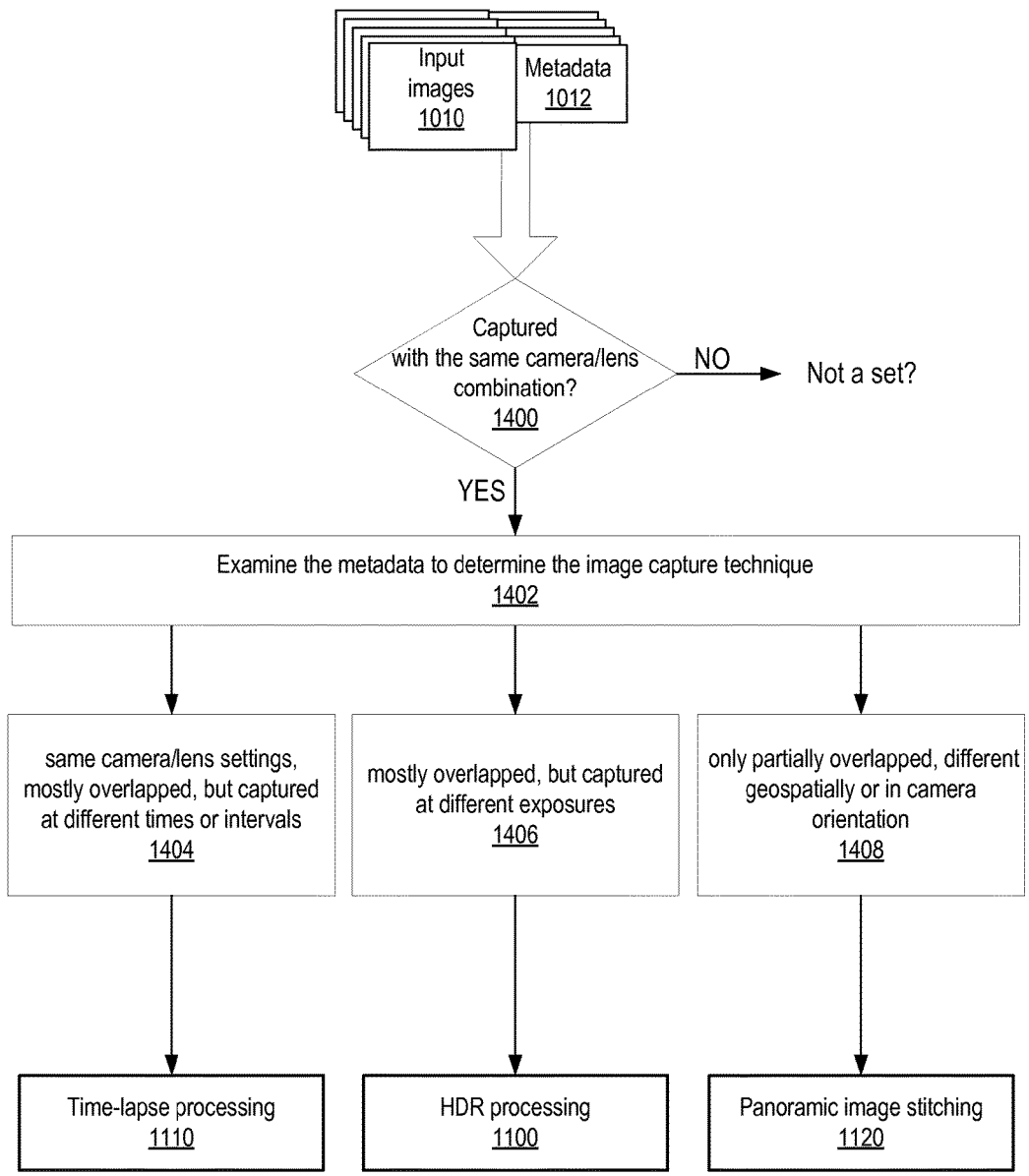
FIG. 27 illustrates an exemplary method for classifying images into categories, according to some embodiments.

FIG. 27 illustrates an exemplary method for classifying images into categories, according to some embodiments. At 1400, metadata 1012 corresponding to a set of images 1010 may be examined to determine if the images were captured with the same camera/lens combination. If the images were not captured with the same camera/lens combination, then the images may not constitute a set, although in some embodiments additional processing may be performed to determine sets according to other criteria.

At 1400, if the images were captured with the same camera/lens combination, then at 1402 the image metadata 1012 may be further examined to determine an image capture technique used to capture images 1010. In this example, at 1404, if the images 1010 were captured with the same camera/lens settings but were captured at different times or intervals, as determined from the image metadata, then the images may be time-lapse images. In one embodiment, the images may also be examined to determine if the images are mostly overlapped, which may help to classify the images as not being component images of a panoramic image. If it is determined that the images 1010 are time-lapse images, then the images may, for example, be placed in a "bucket" for time-lapse processing 1110. At 1406, if the images 1010 were captured at different exposures as determined from the image metadata, then the images may be 8-bit images captured with an HDR image capture technique. In one embodiment, the images may also be examined to determine if the images are mostly overlapped, which may help to classify the images as not being component images of a panoramic image. If it is determined that the images 1010 are HDR component images, then the images may, for example, be placed in a "bucket" for HDR processing 1100. At 1408, if the images were shot at different locations or camera orientations as determined from the image metadata 1012, for example by examining geospatial or camera orientation information in the metadata, then the images may be component images captured using a panoramic image capture technique. In one embodiment, the images may also be examined to determine if the images are only partially overlapped or not overlapped, which may help to classify the images as being component images of a panoramic image. If it is determined that the images 1010 are component images of a panorama, then the images may, for example, be placed in a "bucket" for panoramic image stitching 1120.

The above method for classifying images into categories is exemplary, and is not intended to be limiting. Other information from metadata and/or from the images themselves may be used in classifying images, and other techniques for classifying images according to the metadata than those described may be applied in some embodiments. Furthermore, other categories of images are possible, and similar techniques may be applied to classify groups of images or individual images into other categories according to image metadata than those described.

In some embodiments, information from metadata corresponding to input images 1010 may be used in the panoramic image stitching process 1120. In some embodiments, information from metadata corresponding to input images 1010 may be used to locate other information for the camera/lens combination in a camera/profile database, and that other information may be used in the panoramic image stitching process 1120. As an example, FIG. 4 shows initial unwarping function determination module 406 obtaining initial unwarping function(s) 410 from precomputed unwarping functions (camera/lens profiles) 400. As another example, FIG. 6B shows profile selection module 520 obtaining camera/lens profile 504A from camera/lens profiles 504 according to metadata 512 provided with component images 510. In some embodiments, information from metadata corresponding to input images 1010 may be used to derive other information by some other technique than looking the information up in a camera/lens profile database, e.g. information in the metadata may be used to derive a sensor format factor for the camera sensor, and the derived information may be used in the panoramic image stitching process 1120.

FIGS. 16 through 20 illustrate sets of images captured using two or more of the digital photography techniques illustrated in FIGS. 15A through 15C in one session by a photographer, and exemplary workflows to process the sets of images captured using the respective two or more techniques that each combine two or more workflows or processes specific to the particular techniques that were used in combination to capture the set of images. Embodiments of a method and apparatus for metadata-driven processing of multiple images, for example implemented in a metadata-driven multi-image processing module 1000, may be applied to automating and/or directing these various exemplary workflows according to image metadata corresponding to the sets of images input to the exemplary workflows.

Figure 16:
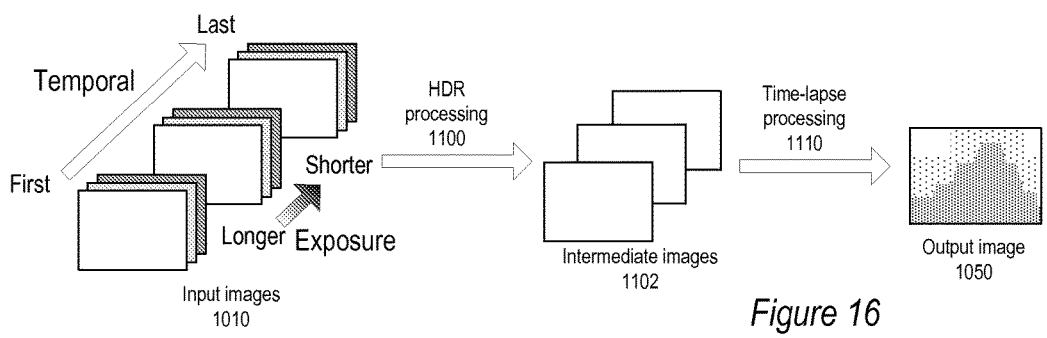
FIG. 16 illustrates an exemplary set of images captured using a time-lapse technique in combination with an HDR image capture technique and the processing thereof according to some embodiments.

FIG. 16 illustrates an exemplary set of images captured using a time-lapse technique in combination with an HDR image capture technique in which images are captured at different exposure settings with the intention of generating an HDR image or images from the set of images. At each time lapse interval, as described above in reference to FIG. 15B, multiple images are captured at different exposure levels, as described above in reference to FIG. 15A. In this example, there are three times at which images are captured, and at each time three images are captured at different exposure levels, thus generating nine input images 1010, grouped into subsets of three images. In one embodiment, HDR processing 1100 may be applied to the input images 1010 to generate a set of three intermediate HDR images 1102. Time-lapse processing 1110 may then be applied to intermediate HDR images 1102 to render an HDR output image 1050. Alternatively, time-lapse processing 1110 may be applied to input images 1010 first to generate a set of nine intermediate 8-bit images 1102, and then HDR processing 1100 may be applied to the intermediate 8-bit images 1102 to render an HDR output image or images 1050.

Figure 17:
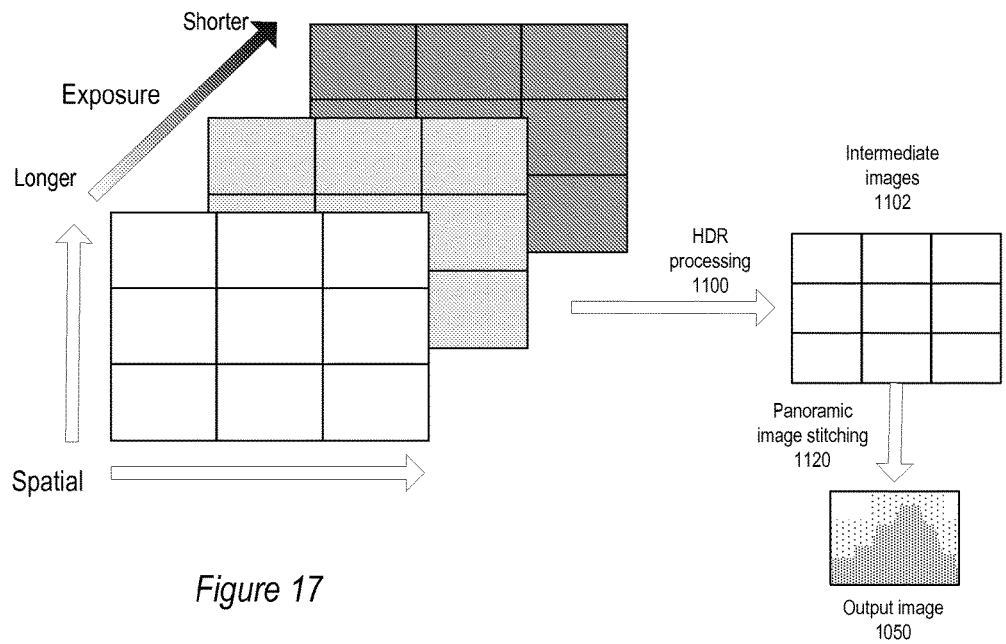
FIG. 17 illustrates an exemplary set of images captured using a panoramic image capture technique in combination with an HDR image capture technique and the processing thereof according to some embodiments.

FIG. 17 illustrates an exemplary set of images captured using a panoramic image capture technique in combination with an HDR image capture technique in which images are captured at different exposure settings. At each location at which a portion of the scene is captured in the panoramic image capture technique as described above in reference to FIG. 15C, multiple images are captured at different exposure levels, as described above in reference to FIG. 15A. In this example, there are nine locations at which component images are captured, and at each location three images are captured at different exposure settings. In one embodiment, HDR processing 1100 may be applied to the input images 1010 to generate a set of nine intermediate HDR images 1102. A panoramic image stitching 1120 may then be applied to the nine intermediate HDR images 1102 to render a composite HDR output image 1050. Alternatively, panoramic image stitching 1120 may be applied to input images 1010 first to generate a set of three intermediate composite 8-bit images, and then HDR processing 1100 may be applied to the three intermediate composite 8-bit images to render a composite HDR output image 1050.

Figure 18:
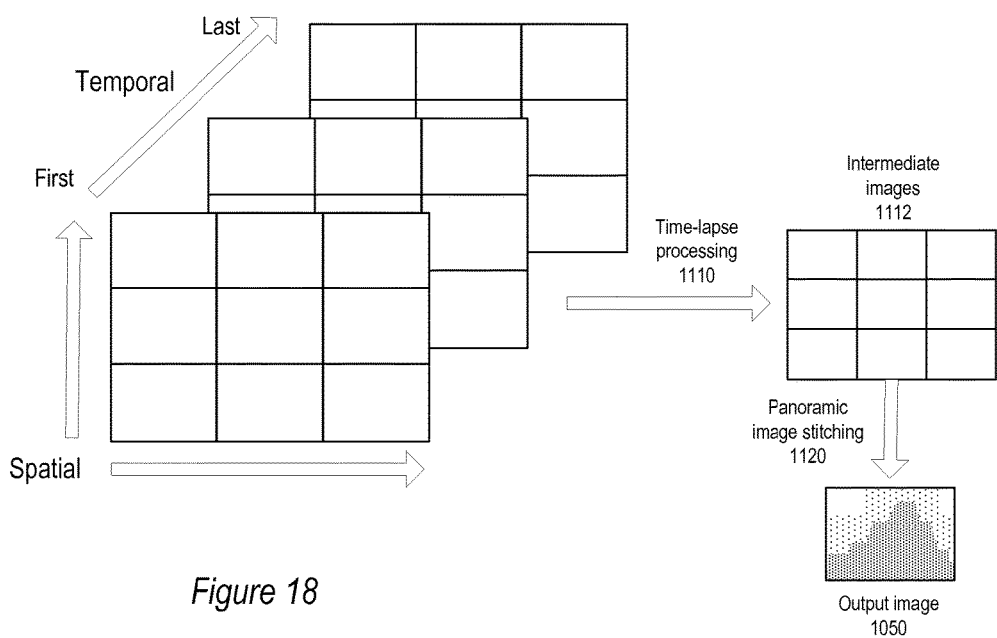
FIG. 18 illustrates an exemplary set of images captured using a panoramic image capture technique in combination with a time-lapse image capture technique and the processing thereof according to some embodiments.

FIG. 18 illustrates an exemplary set of images captured using a panoramic image capture technique in combination with a time-lapse image capture technique in which images are captured at several intervals. At each location at which a portion of the scene is captured in the panoramic image capture technique as described above in reference to FIG. 15C, images are captured at multiple time intervals, as described above in reference to FIG. 15B. In this example, there are nine locations at which component images are captured, and at each location three images are captured at time intervals. In one embodiment, time lapse processing 1110 may be applied to the input images 1010 to generate a set of nine intermediate images 1112. A panoramic image stitching 1120 may then be applied to the nine intermediate images 1112 to render an output image 1050. Alternatively, panoramic image stitching 1120 may be applied to input images 1010 first to generate a set of three intermediate composite images, and then time lapse processing 1110 may be applied to the three intermediate composite images to render an output composite image 1050, or possibly multiple output composite images 1050.

Figure 19A:
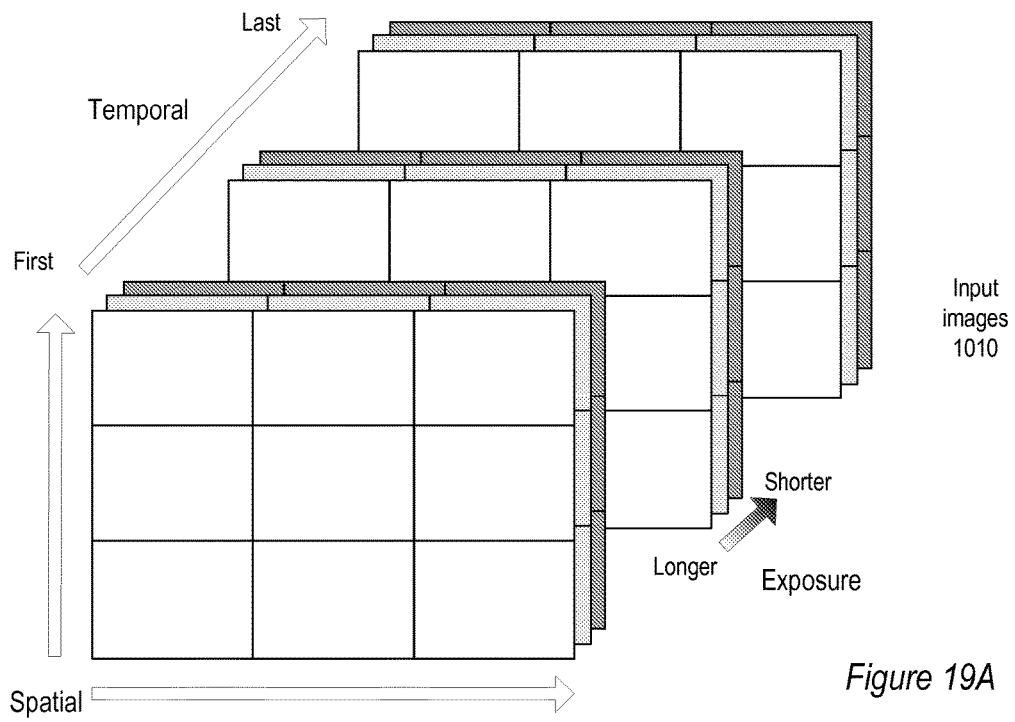
FIG. 19A illustrates an exemplary set of images captured using a panoramic image capture technique in combination with a time-lapse image capture technique and an HDR image capture technique.

FIG. 19A illustrates an exemplary set of images captured using a panoramic image capture technique in combination with a time-lapse image capture technique and an HDR image capture technique. At each location at which a portion of the scene is captured in a panoramic image capture technique as described above in reference to FIG. 15C, images are captured at multiple time intervals, as described above in reference to FIG. 15B. At each time interval at each panorama position, multiple images are captured at different exposure levels, as described above in reference to FIG. 15A. In this example, there are three time intervals at which images are captured at each position, and at each time interval three images are captured at different exposure levels, thus generating nine input images 1010 at each of the nine positions, for a total of 27 images at each time interval, and 81 images total.

FIG. 19A also illustrates the multi-dimensional aspect of input images 1010. Input images 1010 of FIG. 19A may be viewed as a stack of images in three dimensions, including an exposure dimension introduced by the HDR image capture technique, a temporal dimension introduced by the time-lapse photography technique, and a spatial dimension introduce by the panoramic image capture technique.

Figure 19B:
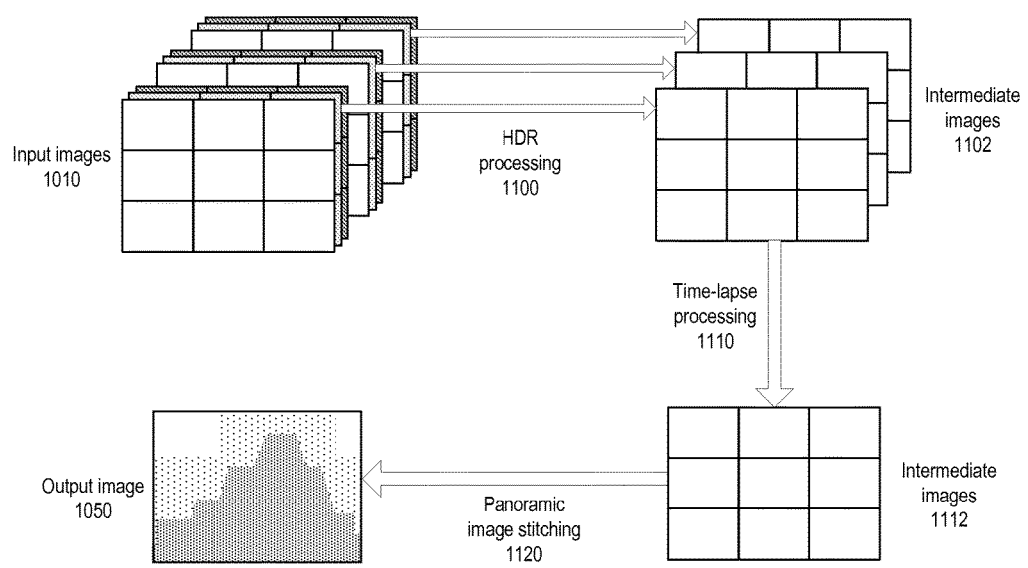
FIG. 19B illustrates an exemplary workflow for processing multi-dimensional sets of input images such as the exemplary set of images illustrated in FIG. 19A according to some embodiments.

FIG. 19B illustrates an exemplary workflow for processing multi-dimensional sets of input images such as the exemplary set of images illustrated in FIG. 19A according to some embodiments. In the exemplary workflow, HDR processing 1100 is first applied to the three HDR component images at each location in the spatial dimension at each time interval in the temporal dimension. Thus, in this example, HDR processing 1100 is applied to 27 sets of three 8-bit images to generate 27 intermediate HDR images 1102. Next, time-lapse processing 1110 is applied to the three time-lapse (HDR) images at each location in the spatial dimension to generate nine intermediate HDR images 1112. Panoramic image stitching 1120 is then applied to the nine intermediate HDR images 1112 to render a composite HDR output image 1050. In alternative workflows for processing multi-dimensional sets of input images such as the exemplary set of images illustrated in FIG. 19A, the order of processing may be different. For example, panoramic image stitching 1120 may be applied first to render, in this example, nine intermediate composite images. HDR processing 1100 may then be applied to the intermediate composite images to render, in this example, three HDR composite images. Time-lapse processing 1110 may then be applied to the HDR composite images. As another example, HDR processing 1100 may be applied first, followed by panoramic image stitching 1120, and then time-lapse processing 1110 may be applied. As yet another example, panoramic image stitching 1120 may be applied first, followed by time-lapse processing 1110, and then HDR processing 1100.

Figure 20:
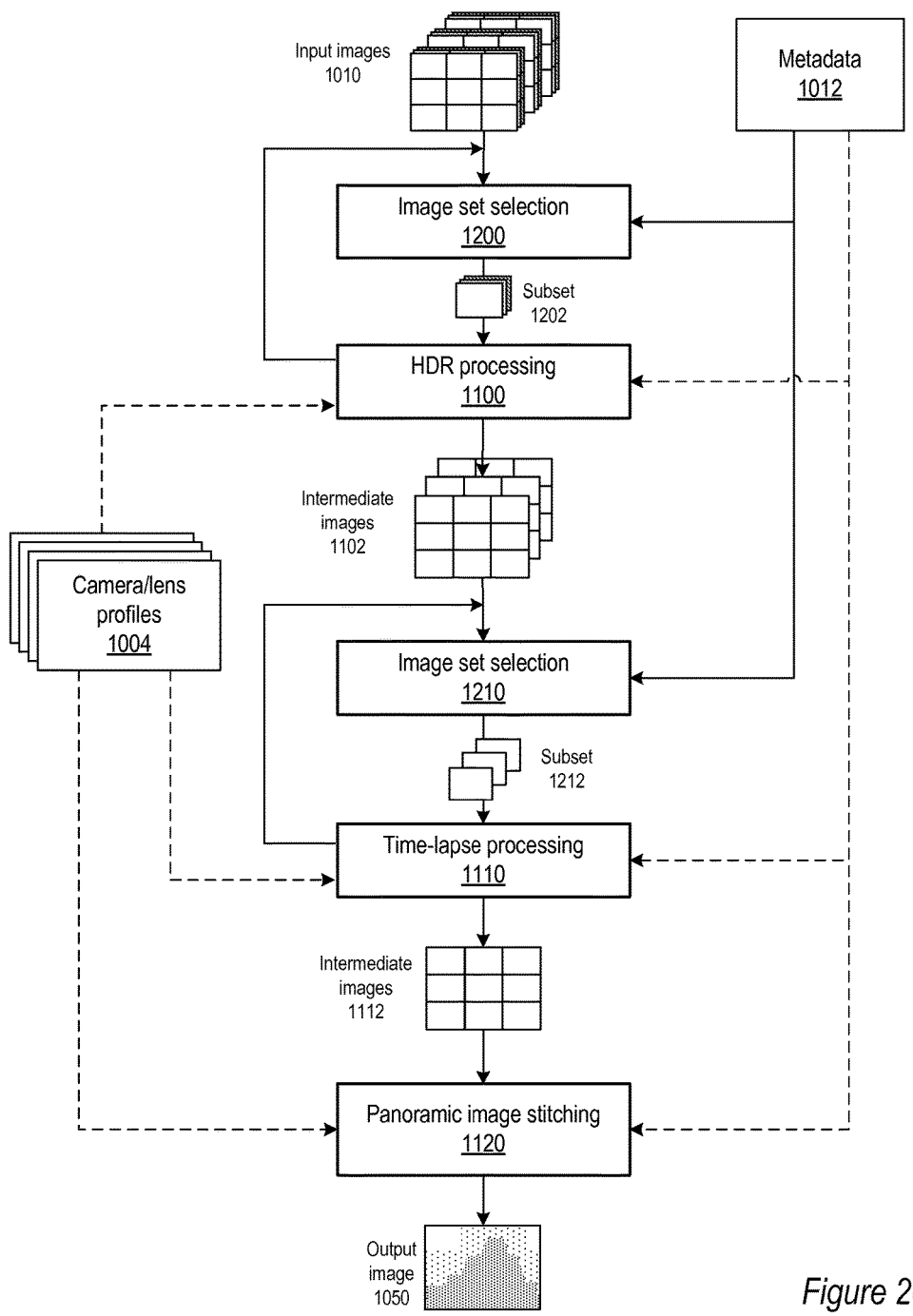
FIG. 20 illustrates the application of image metadata to an exemplary multi-image workflow according to one embodiment.

Embodiments of a method and apparatus for metadata-driven processing of multiple images, for example implemented in a metadata-driven multi-image processing module 1000, may be applied to automating and/or directing the various exemplary workflows illustrated in FIGS. 16, 17, 18 and 19B according to image metadata corresponding to the sets of images input to the exemplary workflows. FIG. 20 illustrates the application of image metadata to an exemplary multi-image workflow according to one embodiment. For this example, the exemplary workflow illustrated in FIG. 19B is used; however, the image metadata may be similarly applied in the exemplary workflows illustrated in FIGS. 16, 17, 18 or alternatives or variations thereof, as well as to alternatives or variations of the exemplary workflow illustrated in FIG. 19B.

A set of input images 1010 is captured using one or more photographic techniques; in this example, a set of input images 1010 is captured using a combination of three techniques, as described in relation to FIG. 19A. While not shown, in one embodiment, the set of input images 1010 may have been classified and placed into a bucket corresponding to the exemplary workflow of FIG. 20 according to the image metadata 1012 corresponding to the images as illustrated in and described for FIG. 14. An image set selection 1200 component may identify, according to the image metadata 1012, subsets 1202 of images from input images 1010 to which HDR processing 1100 is to be applied. HDR processing 1100 may be applied to each of the subsets 1202 to generate a set of intermediate HDR images 1102. In some embodiments, HDR processing 1100 may access and apply information in image metadata 1012 in performing the HDR processing of the images. In some embodiments, HDR processing 1100 may access and apply information from camera/lens profiles 1004, and may use information in image metadata 1012 to locate an appropriate profile from which the information is to be retrieved.

An image set selection 1210 component may identify, according to the image metadata 1012, subsets 1212 of images from input images 1010 to which time-lapse processing 1110 is to be applied. Time-lapse processing 1110 may be applied to each of the subsets 1212 to generate a set of intermediate HDR images 1112. In some embodiments, time-lapse processing 1110 may access and apply information in image metadata 1012 in performing the time-lapse processing of the images. In some embodiments, time-lapse processing 1110 may access and apply information from camera/lens profiles 1004, and may use information in image metadata 1012 to locate an appropriate profile from which the information is to be retrieved.

Panoramic image stitching 1120 may be applied to the set of intermediate HDR images 1112 to generate a composite HDR output image 1050. In some embodiments, panoramic image stitching 1120 may access and apply information in image metadata 1012 in processing the images to render output image 1050. In some embodiments, panoramic image stitching 1120 may access and apply information from camera/lens profiles 1004, and may use information in image metadata 1012 to locate an appropriate profile from which the information is to be retrieved.

Figure 28:
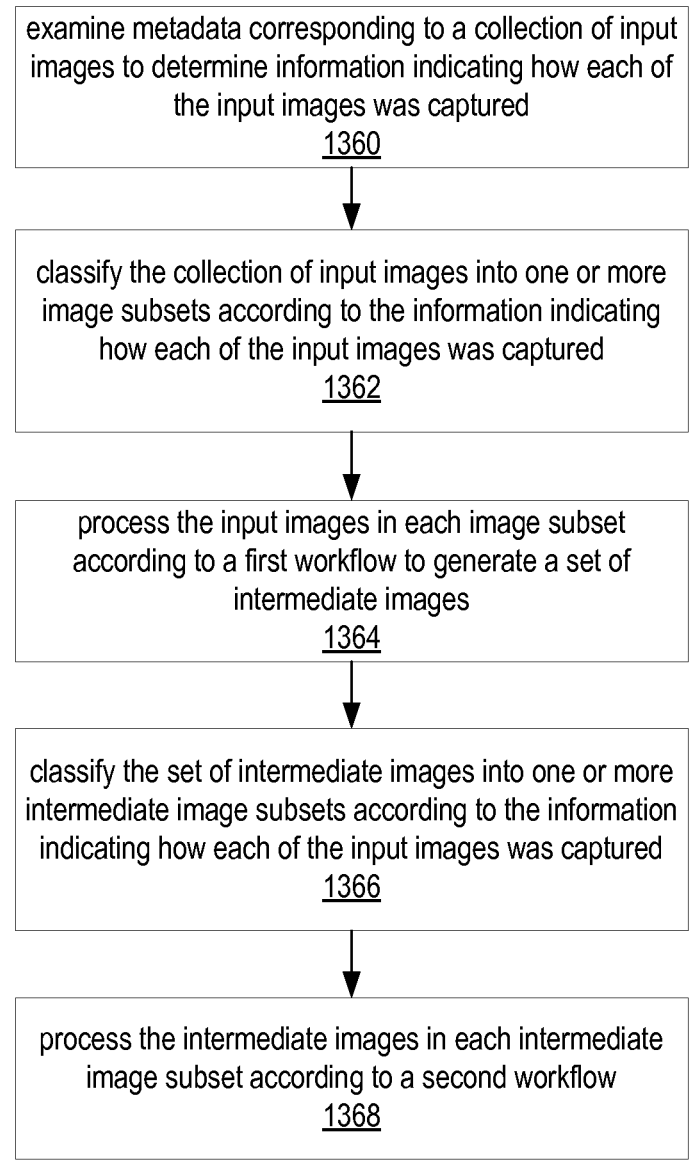
FIG. 28 is a flowchart of a metadata-driven method for processing a collection of input images through a plurality of different workflows or processes, according to some embodiments.

FIG. 28 is a flowchart of a metadata-driven method for processing a collection of input images through a plurality of different workflows or processes, according to some embodiments. In some embodiments, workflow processing may include two or more different workflows. Directing workflow processing of a collection of input images according to information in metadata corresponding to the images may include examining metadata corresponding to the collection of input images to determine information indicating how each of the input images was captured, as indicated at 1360. As indicated at 1362, the collection of input images may be classified into one or more image subsets according to the information indicating how each of the input images was captured. As indicated at 1364, the input images in each image subset may be processed according to a first workflow to generate a set of intermediate images. As indicated at 1366, the set of intermediate images may be classified into one or more intermediate image subsets according to the information indicating how each of the input images was captured. As indicated at 1368, the intermediate images in each intermediate image subset may then be processed according to a second workflow. Note that this process may continue for one or more additional workflows, and may fork so that different subsets of a set of images are passed to different workflows.

As an example, a collection of input images may include a subset of images captured using a combination of two or more of a high dynamic range (HDR) image capture technique, a time-lapse photography technique, and a panoramic image capture technique, and directing workflow processing of the collection of input images according to the determined information may include detecting the subset of images captured using the combination of two or more of the techniques according to the information in the metadata, and applying HDR processing, time-lapse processing, and/or panoramic image stitching to the subset of images as previously described. Generating output image(s) from the collection of input images according to this workflow processing may include combining results from applying two or more of HDR processing, time-lapse processing, and panoramic image stitching to generate one or more output images.

Aligning and Unwarping Distorted Images

The following describes embodiments of a method for aligning and unwarping distorted images. The metadata-driven multi-image processing method, for example implemented as a metadata-driven multi-image processing module 1000, may include an implementation of the method for aligning and unwarping distorted images. For example, an implementation of the method for aligning and unwarping distorted images may be applied in a panoramic image stitching 1120 workflow as illustrated in FIGS. 15C, 17, 18,

19B, and 20. Also described are embodiments of a metadata-driven method for automatically aligning distorted images, as well as further description of a camera/lens profile database and a camera/lens calibration process that may be used in embodiments of the metadata-driven multi-image processing method. FIG. 6B illustrates a metadata-driven workflow method for automatically aligning distorted images, and may be considered a particular embodiment of the metadata-driven multi-image processing module illustrated in FIG. 13. In addition, the methods and modules described below may be implemented as one or more of the exemplary workflows 1008 as illustrated in FIG. 14.

Various embodiments of methods and apparatus for aligning and unwarping distorted images are described. Embodiments may provide a computer-implemented multi-stage image alignment and unwarping method that may, for example, be applied to sets of input images, which may be referred to herein as component images, that include relatively large amounts of distortion in each image, such as images captured using a camera with a wide-angle or fisheye lens, in a computer-automated image stitching process.

A method for aligning and unwarping distorted images is described in which an initial unwarping function(s) is applied to the coordinates of feature points of a set of input component images to generate a set of unwarped, substantially rectilinear, feature points. Implementations of the method may be referred to herein as an image alignment and unwarping module. The substantially rectilinear feature points are then used to estimate focal lengths, centers, and relative rotations for pairs of the input images. A global nonlinear optimization is applied to the initial unwarping function(s) and the relative rotations to generate an optimized unwarping functions and rotations for the component images. The optimized unwarping functions and rotations may then be used to render a panoramic image, generally in the form of a spherical projection, from the input component images. This method does not require a processing- and memory-intensive intermediate step in which the component distorted images are unwarped into an intermediate, very large rectilinear image, as is found in conventional methods.

In addition, a metadata-driven, automated method for aligning and unwarping distorted images is described in which lens profiles for a variety of lens and camera combinations may be precomputed and stored. Metadata commonly stored with digital images may be used to automatically determine if a set of component images from which a panoramic image is to be generated include an excessive amount of distortion, and if so the metadata may be used to determine an appropriate lens profile and unwarping function for an automated aligning and unwarping process.

The above-described methods may be combined in embodiments of an automated method for aligning and unwarping distorted images in an automated image stitching process.

Methods and Apparatus for Aligning and Unwarping Distorted Images

Embodiments of a method for aligning and unwarping distorted images are described. Embodiments may provide a method for registering (aligning) images with excessive distortion, such as images taken with fisheye lenses. Because of the large distortion, conventional alignment workflows, including those modeling lens distortion, do not work well on this type of images. Embodiments may also efficiently unwarp distorted images so that they can be stitched together to form a new image, such as a panorama.

In embodiments of the method for aligning and unwarping distorted images, an unwarping function or functions may be obtained as initial unwarping function(s) in the image alignment and unwarping process. In one embodiment, metadata from the component images may be used to determine a lens profile or profiles that may be used to determine initial unwarping function(s) to be used in an image alignment and unwarping process. A feature extraction and feature matching technique may be performed on each overlapping pair of the component images to generate a set of feature points for the images. In one embodiment, the feature extraction and feature matching first detects features in individual images, and then establishes feature correspondences between overlapping pairs of the images. Each feature point corresponds to one feature correspondence from among the established feature correspondences for all of the images, and each feature point includes a set of coordinates established via the feature matching process. Instead of initially unwarping the component images to generate a very large rectilinear image, embodiments apply the initial unwarping function(s) to the coordinates of the feature points to generate unwarped, substantially rectilinear feature point coordinates. Pair-wise processing is performed using the substantially rectilinear feature points to estimate initial camera rotations, focal lengths, image centers, and possibly other information for the images. The initial unwarping function(s) may be refined for each image using the estimated focal length and center. A global optimization of the camera rotations and refined unwarping functions may then be performed to generate optimized rotations and optimized unwarping functions. The optimized rotations and optimized unwarping functions may then be input to an alignment, unwarping and stitching process that applies the optimized rotations and optimized unwarping functions to the component images to align, unwarp and stitch the component images.

The unwarped set of feature points are referred to as substantially rectilinear feature points because the original coordinates of the feature points may be unwarped to generate coordinates that are nearly or approximately rectilinear, but may not be exactly rectilinear. A reason for the unwarped feature points being termed substantially but not exactly rectilinear is that an initial unwarping function for a particular type (e.g., make and model) of lens may be generated from calibration values obtained by calibrating a particular instance of that type of lens. However, the component images from which the feature points are extracted may have been captured with a different instance of that type of lens. Generally, lens manufacturers produce particular models of lenses with physical and optical attributes that vary within ranges of tolerance. These ranges tend to be very small, especially for high-quality lenses. Therefore, there may be small variations between lenses of the same make and model, variations within the range of the manufacturers' tolerances for that type of lens. Thus, while the initial unwarping function used may be very close to the true unwarping function for the actual lens used to capture the component images, the initial unwarping function may actually differ from the true unwarping function for the actual lens in accordance with the range of variation for that type of lens. Thus, the unwarped coordinates of feature points captured with a particular lens may be approximately, or substantially, rectilinear within a range of variation for that type of lens. In addition, environmental and other factors, such as temperature and humidity, may effect camera lenses and cameras in general, and thus some, generally small, variations in distortion may be introduced in captured images, even using the same lens, under different conditions.

Embodiments of the method for aligning and unwarping distorted images may generate, as output, a panoramic image from the input set of distorted component images. Generally, the output panoramic image may be a spherical projection of the input images; however, other projections, such as cylindrical projections, may also be generated.

Embodiments of the method for aligning and unwarping distorted images may be implemented as or in a tool, module, library function, plug-in, stand-alone application, etc. For simplicity, implementations of embodiments of the method for aligning and unwarping distorted images may be referred to herein as an image alignment and unwarping module.

Figure 1B:
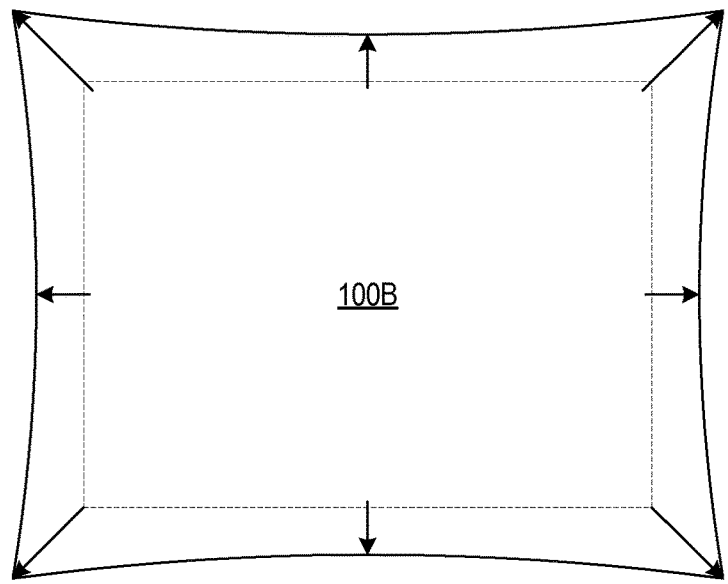
Figure 2A:
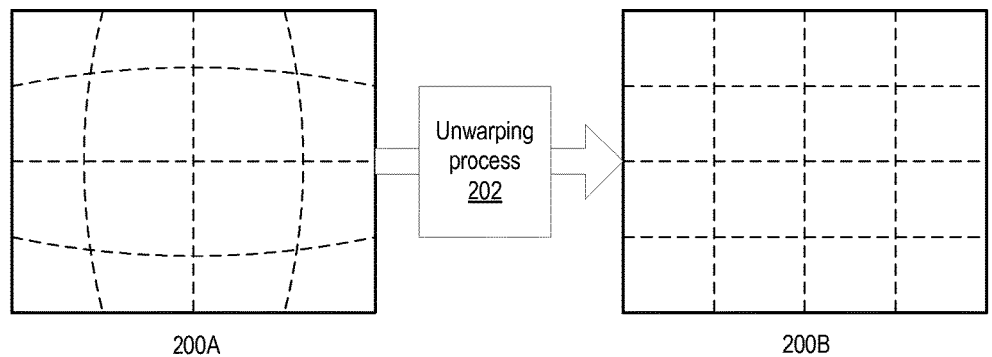
FIGS. 2A and 2B illustrate an unwarping process for barrel distortion and pincushion distortion, respectively.
Figure 2B:
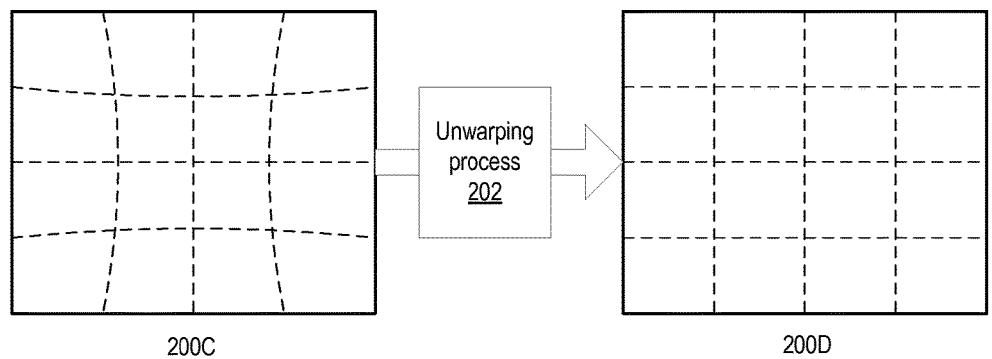

Embodiments are generally described for application to the alignment and unwarping of images captured with lenses that introduce a large amount of pincushion distortion to the images (see element 100B of FIG. 1B and element 200C of FIG. 2B), for example images captured using what are commonly referred to as fisheye lenses. However, embodiments may also be applied to the alignment and unwarping of images with less pincushion distortion than is produced with fisheye lenses, e.g. to images with some pincushion distortion captured using standard or wide-angle lenses. In addition, embodiments may be adapted to align and unwarp images with other types of distortion, such as images with barrel distortion (see element 100A of FIG. 1A and element 200A of FIG. 2A).

FIG. 3 is a flowchart of a method for aligning and unwarping distorted images according to one embodiment. Note that elements 300 and 302 may be performed in reverse order or in parallel. As indicated at 300, feature extraction and feature matching may be performed on an input set of component images to generate a set of feature points for each component image. Feature extraction and feature matching may be performed to extract features and generate point-correspondences from the extracted features for each pair of component images that overlap. As indicated at 302, an initial unwarping function, or functions, for the component images may be obtained. In one embodiment, metadata from a component image may be used to select a camera/lens profile from which lens calibration data may be read and used to automatically determine the initial unwarping function for the image. As indicated at 304, the initial unwarping function(s), which may have been determined from the calibration data in the camera/lens profile corresponding to the lens, may be applied to the coordinates of the feature points for each image to generate a set of unwarped, substantially rectilinear feature points for each image. As indicated at 306, focal lengths and image centers for the images may be estimated from the generated substantially rectilinear feature points, and pair-wise processing of the images may be performed based on the generated substantially rectilinear feature points, image centers and focal lengths to generate initial camera rotations for pairs of the component images. As indicated at 308, the estimated focal length and image center for each component image may be used to refine the initial unwarping function for the component image, thus generating a refined unwarping function for each component image. As indicated at 310, a global optimization may be performed, with the refined unwarping functions and camera rotations as input. In the global optimization, a global, nonlinear optimization technique may be applied to the refined unwarping functions and the camera rotations for the set of component images to generate optimized unwarping functions and optimized camera rotations for the component images. As indicated at 312, a composite, panoramic image may be generated from the set of component images using the optimized unwarping functions and optimized camera rotations. Generally, the output composite image may be rendered as a spherical projection of the input component images; however, other projections, such as cylindrical projections, may be generated.

As noted above, at 302, an initial unwarping function, or functions, for the component images may be obtained using metadata from the component images to select from among camera/lens profiles. Typically, all images in a set of component images are captured with the same camera, and therefore typically all images will share the same camera/lens profile and have the same initial warping function. However, it is possible that at least one component image may have been captured using a different camera/lens combination or configuration, and thus at least one component image may have a different camera/lens profile and initial unwarping function.

FIG. 4 is a data flow diagram of a method for aligning and unwarping distorted images according to one embodiment. A feature extraction and feature matching module 400 may receive an input set of component images 402 and generate a set of feature points for each component image. Feature extraction and feature matching may be performed by module 400 for each overlapping pair of component images to extract features and generate point-correspondences from the extracted features. Module 400 may output initial feature points 408, which includes all feature points generated by module 400 for all component images 402.

An initial unwarping function determination module 406 may obtain an initial unwarping function or functions for the component images 402. In one embodiment, module 406 may use metadata from one or more of component images 402 to select a camera/lens profile 400 from which lens calibration data may be read and used to automatically determine the initial unwarping function(s) 410 for the images. If an initial unwarping function 410 cannot be automatically determined from camera/lens profiles 400, an initial unwarping function 410 may be otherwise obtained, for example via user input.

At initial unwarping function application module 412, the initial unwarping function 410, which may have been determined from the calibration data in the camera/lens profile 400 corresponding to the lens, may be applied to the coordinates of the initial feature points 408 for each image to generate a set of unwarped, substantially rectilinear feature points 414 for each image.

At a pair-wise processing stage, pair-wise processing module 420 may estimate focal lengths and centers for the images from the generated substantially rectilinear feature points 414, and may perform pair-wise processing of the images based on the generated feature points 414 and the estimated focal lengths and centers to generate initial camera rotations for the component images. Thus, pair-wise processing module 420 may output rotations, focal lengths, and centers 422 for the images 402. An unwarping function refinement module 424 may refine the initial unwarping function 410 for each component image using the focal length and image center for the component image to generate a refined unwarping function 428 for each component image. The refined unwarping functions 428, as well as image metrics 422, may then be input to a global optimization module 422 in a multi-image stage for further optimization.

At a multi-image stage, global optimization module 430 may perform a global optimization. In one embodiment, a global, nonlinear optimization technique may be applied by module 430 to the refined unwarping functions 428 and the initial camera rotations for the set of component images 402 to generate optimized unwarping functions 432 and optimized camera rotations 434 for the component images 402.

Figure 5:
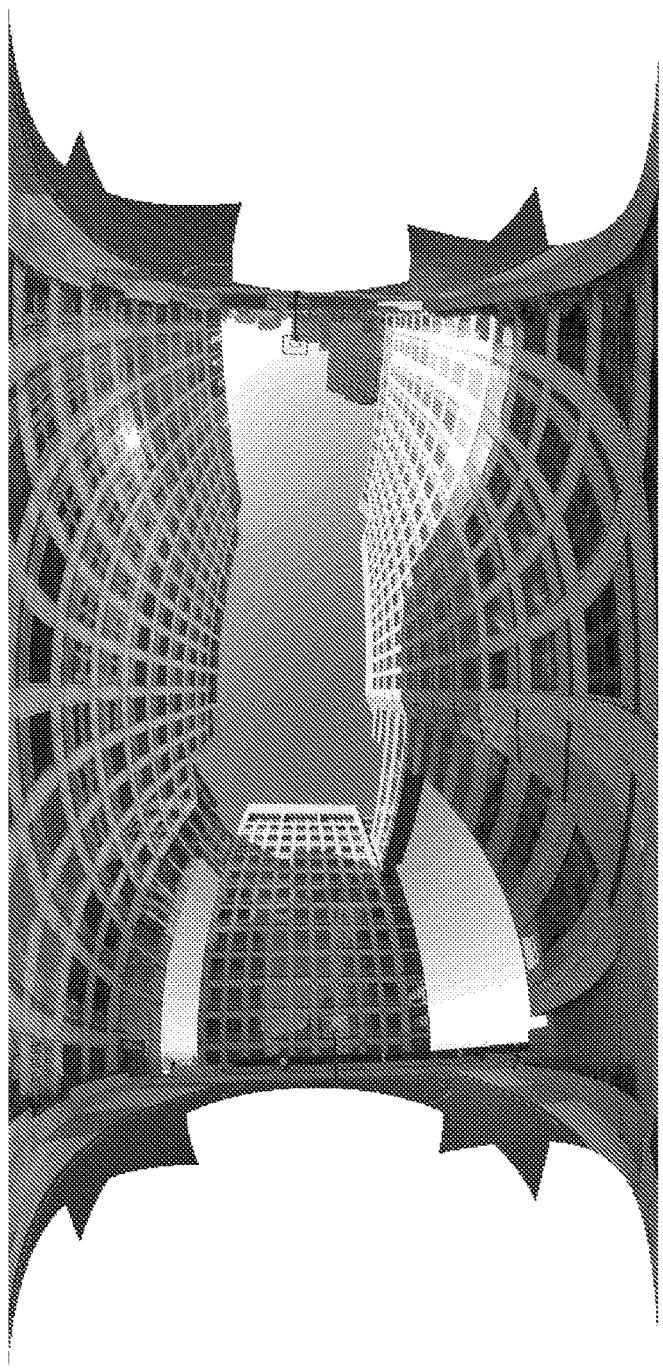
FIG. 5 shows an exemplary spherical projection that may be output by embodiments.

An alignment and unwarping module 440 may use the optimized unwarping functions 432 and optimized camera rotations 434 in generating a composite, panoramic image 450 from the set of component images 402. Generally, the output composite image 450 may be rendered as a spherical projection of the input component images 402; however, other projections, such as cylindrical projections, may be generated. The composite image 450 may be stored to a storage device. FIG. 5 shows an exemplary spherical projection that may be output by embodiments.

As described above, embodiments provide a multi-stage approach for aligning and unwarping images with excessive distortion such as the barrel distortion introduced by fisheye lenses. In one stage, a pre-computed unwarping function is applied to the coordinates of matched feature points. The pre-computed unwarping function is adaptive to the particular camera and lens combination. In another stage, pairs of images are aligned based on features points with a model that accommodates variable focal lengths, image centers and radial distortion. In yet another stage, the unwarping function and image metrics such as radial distortion may be optimized using a global nonlinear optimization technique. This multi-stage approach may provide very good alignment and unwarping results for images with excessive distortion such as images captured with fisheye lenses, and is also applicable to other types of excessive radial distortions.

By applying the unwarping function to the coordinates of the feature points and aligning the substantially rectilinear feature points produced thereby, embodiments do not need to generate intermediate images, which tends to be both memory- and computation-intense. Thus, embodiments may be much more conservative with memory, and less expensive in terms of computation, than conventional methods. By estimating both the image center and the radial distortion in the pair-wise alignment stage, error that may be introduced in the precomputed unwarping functions may be corrected. The combination of the precomputed unwarping function and the image center and radial distortion may typically be an optimal unwarping function for a particular lens and camera combination, thus producing high quality output. Furthermore, embodiments may make it easier and faster to perform the final rendering (unwarping) to generate panoramas from the input composite images.

Technical Details—an Exemplary Modeling Function

Embodiments implement a multi-stage method for aligning and unwarping distorted images. A precomputed unwarping function is applied to feature points detected in the input component images to generate substantially rectilinear feature points. An alignment model is then estimated and refined at a pair-wise stage using the feature points that have been unwarped. At a multi-image stage, the alignment model may then be globally optimized using a global nonlinear optimization technique. Optionally, the input images may be stitched onto an output surface (such as a sphere or cylinder) to form a panoramic image. The pair-wise stage may account for variability that is not accounted for in the precomputed unwarping function. Embodiments do not need to generate large, compute-intensive unwarped images at an intermediate stage; the actual unwarping of the images is only performed in the last (optional) step, after the alignment parameters and unwarping functions are computed and optimized.

The following is a technical description of an exemplary modeling function according to one embodiment, and describes in more detail the processing performed in the pair-wise stage and the multi-image stage to generate an optimized unwarping function and image metrics.

Equidistant fisheye lenses are used as an example. The procedure is applicable to other types of excessive radial distortions, although details may be different. For equidistance fisheye lenses, a 5-parameter polynomial model ($R_d$) may be used to relate the radial distance with the angle between the optical axis and the incoming ray. Other models may be used, for instance a 1- or 3-parameter polynomial model.

To be more precise, let $\varphi$ (phi) be the angle between an incoming ray and the optical axis, and $r_d$ be the radial distance. This gives equation 1, the unwarping function, or estimated distortion model:

$$r_d = R_d(\varphi) = \sum_{i=1}^{5} p_i \varphi^i \qquad (1)$$

where $[p_1, p_2, p_3, p_4, p_5]$ are the five parameters in the polynomial model ($R_d$). Given a three-dimensional (3-D) point $[X_1, X_2, X_3]$, $\varphi$ can be computed as:

$$\varphi = \arctan\left(\frac{\sqrt{x_1^2 + x_2^2}}{x_3}\right)$$

The value $r_d$ can be computed as:

$$r_d = \sqrt{(x_{d1} - c_1)^2 + (x_{d2} - c_2)^2}$$

where ($c_1$, $c_2$) is the center of the distortion (which is close to the center of the distorted image) and ($x_{d1}$, $x_{d2}$) is the distorted point location. A point ($x_{d1}$, $x_{d2}$) in distorted pixel units may then be related with a point ($x_{u1}$, $x_{u2}$) on the undistorted image plane as:

$$\left[\begin{array}{c} x_{d1} \\ x_{d2} \end{array}\right] - \left[\begin{array}{c} c_1 \\ c_2 \end{array}\right] \cdot \frac{\tan(\varphi(r_d))}{r_d} = \left[\begin{array}{c} x_{u1} \\ x_{u2} \end{array}\right]$$

where:

$$r_d = \sqrt{(x_{d1} - c_1)^2 + (x_{d2} - c_2)^2}$$

and $\varphi(r_d)$ is the inverse function of $r_d = R_d(\varphi)$. A description of how this function may be computed numerically is provided later in this document.

The 5-parameter polynomial is pre-determined for a combination of a lens and a camera. This may be done by performing calibration with images of known patterns. Note that, in this step, both the polynomial parameters and ($c_1$, $c_2$) may be imperfect in that they may not be exactly the same as the true values. However, they should be reasonably close to the true values. This property will be used later.

Different methods may be used in various embodiments for generating the final, optimized unwarping functions and optimized rotations. Referring to FIG. 4, one methods is to take the initial feature points (feature points 408 in FIG. 4), the initial values from pair-wise processing (element 422 of FIG. 4), and the estimated distortion model (equation (1) from above) and perform a global optimization 430 to generate optimized rotations 432 and optimized unwarping functions 434. Using this method does not necessarily generate an estimated radial distortion model. Another methods is to, instead take the substantially rectilinear feature points 414 of FIG. 4 and a simple estimated radial distortion model (see below) and perform a global optimization 430. After optimizing the radial distortion model, the optimized radial distortion model can be combined with a refined unwarping function 428 to generate optimized rotations 432 and optimized unwarping functions 434. Both methods may produce similar results, and either method may be implemented in various embodiments.

In one embodiment, alignment may be performed as follows. A model that has a radial distortion component may be estimated. For simplicity, results for two images will be shown. However, the procedure may be extended to an arbitrary number of images. Let f be the focal length for the two images, and let R be the rotation between the two images. Let $(k_1, k_2)$ be the radial distortion parameters. For simplicity, it is assumed that $(f, k_1, k_2)$ are the same for the two images. It is trivial to generalize to the case where the focal length and radial distortion parameters are different for different images. The alignment model indicates that the following relationships hold:

$$\frac{1}{f}\begin{bmatrix} x_1 \\ x_2 \end{bmatrix} = \pi\left(R \circ \begin{bmatrix} \frac{y_1}{f} \\ \frac{y_2}{f} \end{bmatrix}\right)$$

and $$\begin{bmatrix} x_{u1} \\ x_{u2} \end{bmatrix} - \begin{bmatrix} d_1 \\ d_2 \end{bmatrix} = f\begin{bmatrix} x_1 \\ x_2 \end{bmatrix}(1 + k_1 r_x^2 + k_2 r_x^4)$$

$$\begin{bmatrix} y_{u1} \\ y_{u2} \end{bmatrix} - \begin{bmatrix} d_1 \\ d_2 \end{bmatrix} = f\begin{bmatrix} y_1 \\ y_2 \end{bmatrix}(1 + k_1 r_y^2 + k_2 r_y^4)$$

where:

$$r_x = \sqrt{x_1^2 + x_2^2}$$

$$r_y = \sqrt{y_1^2 + y_2^2}$$

For an arbitrary $$\begin{bmatrix} x \\ y \end{bmatrix}, \pi\left(R \circ \begin{bmatrix} x \\ y \end{bmatrix}\right)$$

is defined as:

$$\begin{bmatrix} \frac{R_{11}x + R_{12}y + R_{13}}{R_{31}x + R_{32}y + R_{33}} \\ \frac{R_{21}x + R_{22}y + R_{23}}{R_{31}x + R_{32}y + R_{33}} \end{bmatrix}$$

Note that $(d_1, d_2)$ is the image center estimated in the alignment procedure;

$$\begin{bmatrix} x_{u1} \\ x_{u2} \end{bmatrix} \text{ and } \begin{bmatrix} y_{u1} \\ y_{u2} \end{bmatrix}$$

are those points computed after applying the pre-determined unwarping functions, and may be different for different images. It will be shown that it is possible to unfold $(d_1, d_2)$ into $(c_1, c_2)$ and combine $(f, k_1, k_2)$ and the 5-parameter polynomial into a single radial model. Note that when $(x_{d1}, x_{d2})$ approaches $(c_1, c_2)$, $$\frac{\tan(\varphi(r_d))}{r_d}$$

is a constant. Let this constant be K. It is easy to show for equidistance fisheye lenses that $$\frac{\tan(\varphi(r_d))}{r_d}$$

does not vary much from K. Therefore, $(d_1, d_2)$ can be unfolded into $(c_1, c_2)$ as:

$$\begin{bmatrix} c_1 + d_1/K \\ c_2 + d_2/K \end{bmatrix}$$

This yields:

$$\begin{bmatrix} x_{d1} - c_1 - d_1/K \\ x_{d2} - c_2 - d_2/K \end{bmatrix} \frac{\tan(\varphi(r_d))}{r_d} = f\begin{bmatrix} x_1 \\ x_2 \end{bmatrix} \cdot (1 + k_1 r_x^2 + k_2 r_x^4)$$

where:

$$r_d = \sqrt{(x_{d1} - c_1 - d_1/K)^2 + (x_{d2} - c_2 - d_2/K)^2}$$

and where:

$$r_x = \sqrt{x_1^2 + x_2^2}$$

This leads to:

$$r_d = R_d(\arctan(f \cdot r_x(1 + k_1 r_x^2 + k_2 r_x^4)))$$

$$\begin{bmatrix} x_{d1} \\ x_{d2} \end{bmatrix} = \frac{r_d}{r_x}\begin{bmatrix} x_1 \\ x_2 \end{bmatrix} + \begin{bmatrix} c_1 + d_1/K \\ c_2 + d_2/K \end{bmatrix}$$

This means, for a given $$\begin{bmatrix} x_1 \\ x_2 \end{bmatrix}, \begin{bmatrix} x_{d1} \\ x_{d2} \end{bmatrix}$$

can be easily computed, which is important for rendering the final panoramas. Note that other rendering surfaces may be used. For example, for spherical panoramas, from $(\alpha, \beta)$, the following:

$$\begin{bmatrix} X_1 \\ X_2 \\ X_3 \end{bmatrix}$$

may be computed as:

$$\begin{bmatrix} \sin(\alpha)\cos(\beta) \\ \sin(\beta) \\ \cos(\alpha)\cos(\beta) \end{bmatrix} \text{ and } \begin{bmatrix} x_1 \\ x_2 \end{bmatrix} = \begin{bmatrix} X_1/X_3 \\ X_2/X_3 \end{bmatrix}$$

From:

$$r_d = R_d(\arctan(f \cdot r_x(1+k_1 r_x^2 + k_2 r_x^4)))$$

it is known that $r_x$ can be also expressed as a function of $r_d$:

$$r_x = R_x(r_d) \text{(inverse function theorem)}.$$

Therefore, $$\begin{bmatrix} x_{d1} - c_1 - d_1/K \\ x_{d2} - c_2 - d_2/K \end{bmatrix} \frac{\tan(\varphi(r_d))}{r_d} \cdot \frac{1}{f} \cdot \frac{1}{(1+k_1 R_x^2(r_d) + k_2 R_x^4(r_d))} = \begin{bmatrix} x_1 \\ x_2 \end{bmatrix}$$

Since $$\begin{bmatrix} x_1 \\ x_2 \end{bmatrix} \text{ and } \begin{bmatrix} y_1 \\ y_2 \end{bmatrix}$$

are related through:

$$\frac{1}{f}\begin{bmatrix} x_1 \\ x_2 \end{bmatrix} = \pi\left(R \cdot \begin{bmatrix} y_1/f \\ y_2/f \end{bmatrix}\right)$$

it is known that:

$$\begin{bmatrix} x_{d1} - c_1 - d_1/K \\ x_{d2} - c_2 - d_2/K \end{bmatrix} \frac{\tan(\varphi(r_d))}{r_d} \cdot \frac{1}{f} \cdot \frac{1}{(1+k_1 R_x^2(r_d) + k_2 R_x^4(r_d))}$$

is the optimal unwarping function based on the input feature correspondences. This function makes sense in that:

$$\begin{bmatrix} c_1 + d_1/K \\ c_2 + d_2/K \end{bmatrix}$$

is the new distortion center, and:

$$\arctan\left(\tan(\varphi(r_d)) \cdot \frac{1}{f} \cdot \frac{1}{(1+k_1 R_x^2(r_d) + k_2 R_x^4(r_d))}\right)$$

is the new function for relating $r_d$ with $\varphi$.

Numerical Computation $\varphi(r_d)$ may need to be computed numerically for any $r_d$ in order to unwarp the feature points. For equidistance fisheye lenses, it is noted that $p_1$ dominates the whole function. Therefore, in embodiments, an iterative algorithm such as the exemplary algorithm shown below may be used to apply the unwarping operation:

$$\varphi_0 = r_d/p_1$$

for ($i = 1$: MAX_ITERATION_COUNT), do:

$$\varphi_i = \left(r_d - \sum_{j=2}^{5} p_j \varphi_{i-1}^j\right)/p_1$$

Note that K is given by $1/p_1$.

Metadata-Driven Method for Automatically Aligning Distorted Images

Images captured with extreme wide-angle lenses designed to capture large fields of views are known to be difficult for automatic image alignment algorithms due to the extreme distortion these images contain. Large distortion is typically not modeled in conventional alignment algorithms; thus, conventional automatic alignment algorithms fail if directly applied to these distorted images. In conventional automatic image alignment methods, the user has to specify whether a lens such as a fisheye lens that produces large amounts of distortion was used, and if so which particular lens was used. If the user does not do this, the distorted images will not be aligned properly. Having the user indicate the use of a wide-angle lens and specify the exact model of the lens used in capturing the distorted images may alleviate some of the problems. However, this requires the user to input additional information, which results in a tedious workflow.

Embodiments of a metadata-driven workflow for automatically aligning distorted images are described. Embodiments of the metadata-driven workflow described herein are easier to use for aligning images taken with lenses that produce large amounts of distortion than are conventional image alignment methods. In embodiments, the user does not need to specify anything for many or most cases, as the described method automatically attempts to obtain the information needed to align and unwarp distorted images based on metadata stored with the images. In embodiments, information about how the images were captured, for example the make and model of the lens and camera, may be inferred from the metadata stored with the images. This information may be used to select an appropriate camera/lens profile from among a set of predetermined camera/lens profiles. Lens calibration information in the selected camera/lens profile may then be used to align and unwarp the distorted images. Thus, the user may not need to specify detailed information regarding the cameras and lenses used to capture distorted images. Embodiments may also allow the user to specify custom camera/lens profiles, for example when metadata are not available or a predetermined camera/lens profile is not available. In one embodiment, the user may provide a custom lens profile if necessary or desired.

Most digital cameras store metadata with captured images. Digital image metadata formats may include, but are not limited to, Exchangeable Image File Format (EXIF); IPTC, a standard developed by the International Press Telecommunications Council; and Extensible Metadata Platform (XMP) developed by Adobe™. The metadata for the component images may be accessed to determine, for example, what particular lens and/or camera the images were taken with. In embodiments, this information obtained from the image metadata may then be used to look up a camera/lens profile for the make/model of lens that was used to capture the component images in a file, database, table, or directory of camera/lens profiles. The calibration data stored in the camera/lens profiles may, for example, have been previously generated by calibrating examples of the respective lenses and cameras.

Figure 6A:
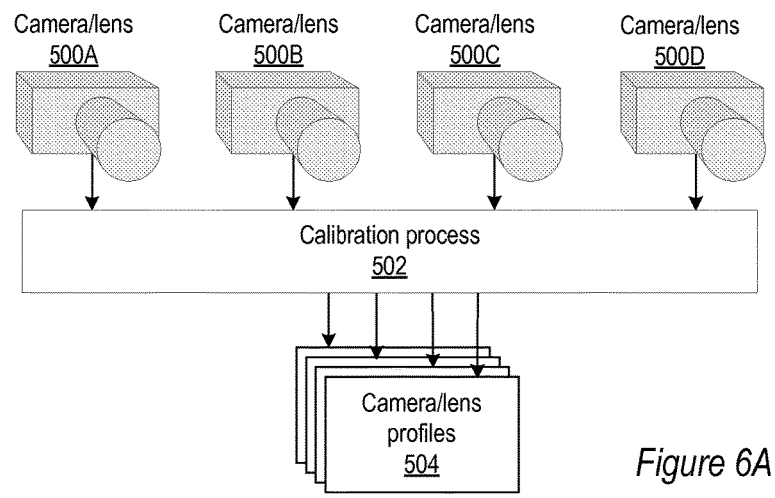
FIGS. 6A and 6B illustrate a metadata-driven workflow for automatically aligning distorted images according to one embodiment.
Figure 6B:
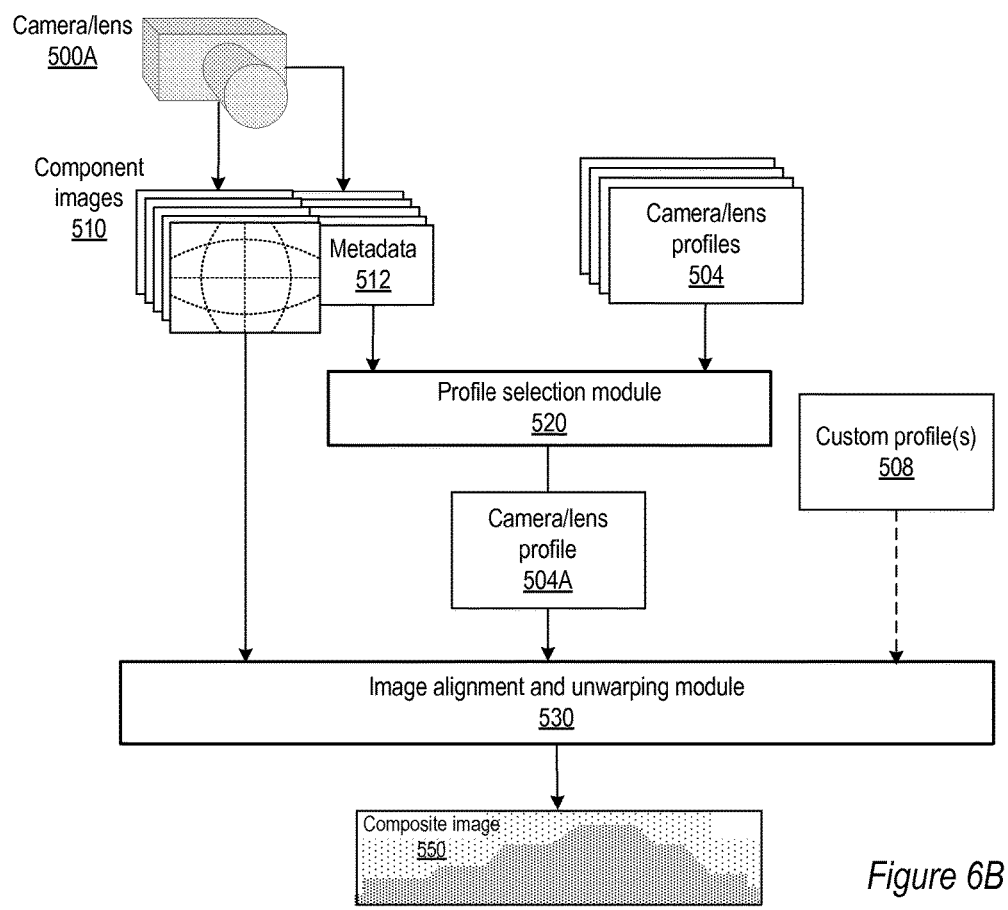

FIGS. 6A and 6B illustrate a metadata-driven workflow for automatically aligning distorted images according to one embodiment. FIG. 6A illustrates an offline, preliminary stage in which different camera/lens combinations 500 are calibrated via a calibration process 502 to generate camera/lens profiles 504. In one embodiment, calibration rigs and other software and hardware tools may be used in calibration process 502.

In some embodiments, the calibration data (or lens profiles) may be formatted and stored according to a markup language in a markup language file or files (camera/lens profiles 504). An exemplary markup language that may be used in one embodiment is eXtensible Markup Language (XML). Other markup languages or other data/file formats may be used in other embodiments.

FIG. 7 shows an exemplary camera/lens profile 504 for a single camera/lens in XML format, according to one embodiment. In one embodiment, there may be two categories of properties defined in each camera/lens profile 504. A first set of properties may be used in matching the camera/lens profile against the metadata read from the input image. In one embodiment, all but one of these matching properties may be omitted from the description, and at least some of these properties may also have empty values. In both cases, the omitted properties would not be used to match against the profiles. The matching properties may include one or more of, but are not limited to:

- Camera:Make—The camera manufacturer
- Camera:Model—The model name of the camera
- Camera:SerialNumber—The serial number of the camera
- Camera:Lens—A description of the lens
- Camera:LensInfo—Min/Max focal length and aperture combination(s)
- Camera:ImageWidth—The image width
- Camera:ImageLength—The image height
- Camera:ApertureValue—The lens aperture
- Camera:Fnumber—The F number The second set of properties define the actual camera/lens profile data that are meaningful to the lens correction model being used, for example an implementation of the method for aligning and unwarping distorted images described herein. Some of the properties may be optional. However, when the properties are present, the properties can be used to override constants/defaults or internally calculated values. The second set of properties may include one or more of, but are not limited to:

- Camera:SensorFormatFactor—The format factor/crop factor/focal length multiplier of the image sensor with respect to the 35 mm film. In one embodiment, optional.
- Camera:ImageXCenter—The optical image center in the width (X) direction, normalized by the image width. In one embodiment, optional. In one embodiment, default 0.5.
- Camera:ImageYCenter—The optical image center in the height (Y) direction, normalized by the image height. Float. In one embodiment, optional. In one embodiment, default 0.5.
- Camera:LensPrettyName—Pretty lens name (make and model). String. In one embodiment, optional but recommended.
- Camera:FishEyeLens—True if the lens is a fisheye lens. Boolean. In one embodiment, optional.
- Camera:FishEyeModelParams—List of fisheye lens calibration parameters. In one embodiment, required if the lens is a fisheye lens.

A comprehensive set of camera/lens profiles 504 generated by calibration process 502 may be provided with various digital imaging products such as Adobe™ Photoshop™ or Adobe™ Photoshop™ Camera RAW plug-in for Photoshop™, or may be provided to consumers via other channels or methods. For example, a website may be provided from which camera/lens profiles 504 may be downloaded, or a camera/lens manufacturer may provide camera/lens profiles for their cameras/lenses with the camera/lens or via a website. In one embodiment, a software program or plug-in module for calibrating camera/lens combinations may be provided to consumers so that end users may calibrate their own lenses.

FIG. 6B illustrates a metadata-driven workflow method for automatically aligning distorted images according to one embodiment. A user captures a set of component images 510 with a camera/lens 500A. Note that the set of component images 510 may include one or more images. The camera stores metadata 512 with the image(s) 510. The set of component images 510 may be loaded into a digital imaging system that implements the metadata-driven workflow method for automatic alignment. A profile selection module 520 compares the metadata 512 to camera/lens profiles 504 to determine if any of the images 510 were taken with a known lens. If so, then the image(s) 510 may be automatically aligned and unwarped by image alignment and unwarping module 530 using the lens profile information from the corresponding camera/lens profile 504. In this example, camera/lens profile 504A was identified as matching the metadata 512, and so the lens profile information from that camera/lens profile will be used by image alignment and unwarping module 530.

In one embodiment, image alignment and unwarping module 530 may implement an embodiment of the method for aligning and unwarping distorted images as described herein. In embodiments of this method, the feature points detected on the image or images may be unwarped to their substantially rectilinear versions using a precomputed unwarping function obtained from the lens profile information stored in a camera/lens profile 504 matching the image metadata 512. The method does not directly unwarp the image(s), but instead only unwarps the feature points. This avoids the problem found in conventional methods of creating very large intermediate images. In addition, the unwarping function may be based on a combination of the lens profile and the camera used to capture the images. In other words, while the profile for a lens A may be established via a process as described in FIG. 6A using a camera B, the unwarping function for lens A may be used on images taken with lens A and camera C. In other words, embodiments may adjust the unwarping function automatically based on the camera/lens combination information from camera/lens profiles 504.

Once the feature points are unwarped into substantially rectilinear feature points, the images 510 may be aligned by image alignment and unwarping module 530 as if they were taken with regular rectilinear lenses. For an exemplary method of aligning the images, see the embodiments of the method for aligning and unwarping distorted images as described elsewhere herein.

Once alignment is computed and a composition canvas is chosen (typically, but not necessarily, spherical), the images may be unwarped by image alignment and unwarping module 530 to create the final composition (e.g., composite image 550) by combining the lens profile, camera information and alignment parameters. Such a combination is similar to what may be done as described above where the lens profile is adapted to the particular camera used in capturing the images 510. If images 510 include a large amount of distortion, a spherical projection will typically be used. In one embodiment, the choice of what projection model to use may be made automatically made based on the metadata 512 read from the images. The composite image 550 may be stored to a storage device. FIG. 5 shows an exemplary spherical projection that may be output by embodiments.

It is possible that the metadata 512 may not be sufficient for detecting images with large distortion, for example images captured with a fisheye lens. For example, there are fisheye converters which are purely mechanical and do not carry any electronic data. Therefore, the metadata 512 captured in the image may not include information to identify images 510 as being captured via such a converter. Thus, one embodiment may provide a user interface that allows the user to override the default behavior and to identify a custom camera/lens profile 508, as shown in FIG. 6B. Image alignment and unwarping module 530 then processes the images 510 as described above using the custom profile 508 instead of a profile 504 identified from image metadata 512.

It is possible that a set of component images 510 may not include metadata 512, or that the metadata 512 may not sufficiently specify the camera/lens combination 500. Therefore, one embodiment may provide one or more user interface elements whereby the user may select a camera/lens profile 504 that best matches the camera/lens 500 used to capture component images 510 that are to be processed. It is also possible that there may not be an existing camera/lens profile 504 corresponding to the lens used to capture the component images. In one embodiment, the user may use the user interface elements to select an existing camera/lens profile 504 that most closely matches the actual camera/lens 500 used to capture the component images. Alternatively, the method may be configured to attempt to automatically determine an existing camera/lens profile 504 that most closely matches the actual camera/lens 500 used to capture the component images. If a close match is found, then that best-matching camera/lens profile 504 may be used. If not, then the user may be asked to select a camera/lens profile 504, or to create a new camera/lens profile 504, or to otherwise obtain an appropriate camera/lens profile 504, for example by downloading one via the Internet.

One embodiment may provide one or more user interface elements whereby a user may enter appropriate information to generate a new camera/lens profile 508 for the lens. One embodiment may provide user interface elements and a software module via which the user may perform a calibration of the user's camera/lens and thus generate a new camera/lens profile 508 for the lens. Note that the calibration data stored in the camera/lens profiles 504 may have been previously generated by physically calibrating examples of the respective lenses and cameras "at the factory." Individual lenses of the same make and model may have small differences. The above-mentioned user interface elements and software module may thus be used to replace or modify a default or factory camera/lens profile 504 for a make/model of lens to thus create a new profile specific to the particular camera/lens of the same make/model used by the photographer, if so desired.

Other Applications of Image Metadata

The above generally describes using metadata from captured images to drive an automated workflow process for unwarping images with excessive amounts of distortion, such as images captured with fisheye lenses. The automated workflow process generally involves determining a precalculated unwarping function from the metadata. However, image metadata may be applied in different ways and for different purposes.

For example, image metadata may be used to automatically determine if and when an image processing application, system or automated workflow needs to invoke lens distortion estimation. This is more or less independent of the workflow process described above. In this method, the metadata may be used to detect if an image was captured using a lens that introduces distortion. If such a lens is detected, the method may optionally invoke a distortion estimation function that estimates lens distortion directly from the images. The distortion may be simple radial distortion or more complicated distortion, such as extreme distortion introduced by a fisheye lens. This information may be determined from the metadata, for example from a lens type indicated in the metadata. In the case of a lens that introduces excessive amounts of distortion, the method may determine a lens profile for the lens from a set of precomputed lens profiles, similar to the above-described metadata-driven workflow process implementation. In the case of a lens that introduces simple radial distortion, the method may either determine and load a lens profile or simply estimate the amount of distortion directly from the images. Optionally, the user may be informed via a user interface that the lens distortion estimation has been invoked. Variations on this method are possible.

As another example of a different use for image metadata is in a method to automatically set tuning parameters for an image alignment algorithm. For example, for some types of images, the image centers may be reliably estimated, while for other types of images, it may not be easy or even possible to reliably estimate the image centers. Therefore, image metadata may be used to detect whether an image or set of image is of a type for which the image centers can be reliably estimated. If they are, then an image center detection module may be called. If not, some other method of determining or estimating image centers may be invoked. As another example, the image metadata may be used to detect if a set of component images were captured using a fisheye lens and, if so, the output mode for the images may be automatically set to generate a spherical rendering of the images.

As another example of possible used for image metadata, for fisheye images, since the unwarping function is not perfect and generates substantially, but not truly, rectilinear coordinates from the initial feature points, it may be desirable to tolerate more error in the pair-wise processing step. Thus, if it is detected that the images are fisheye images, parameters of the pair-wise processing module may be adjusted to account for the fact that pair-wise processing of fisheye images is to be performed. Similarly, parameters of the pair-wise processing module or of other modules may be adjusted according to lens, camera, or other information from the image metadata, and/or one or more modules or processing steps may be performed or skipped depending upon information from the image metadata.

Module Implementations

Figure 8:
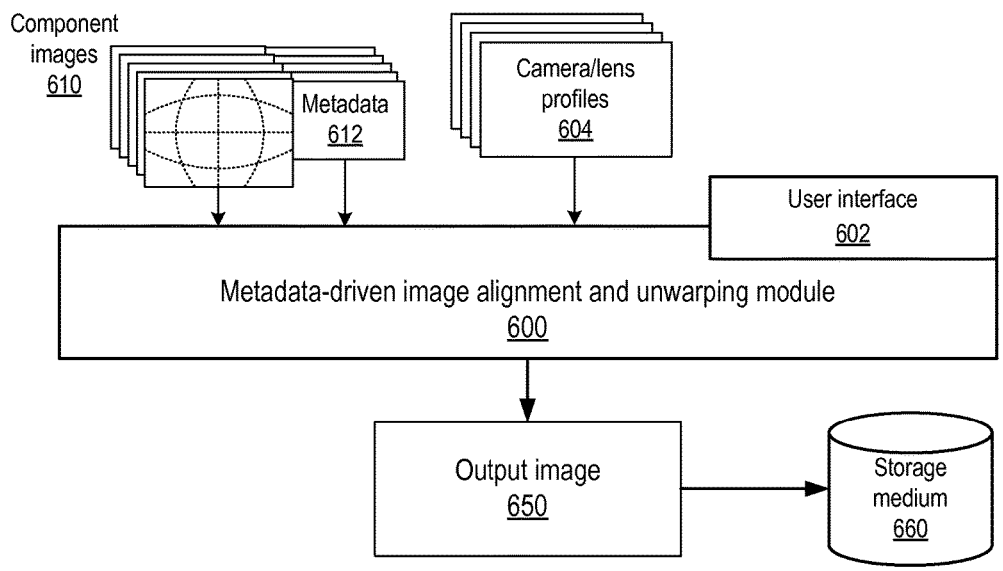
FIG. 8 illustrates a metadata-driven image alignment and unwarping process as a module, and shows the input and output to the module, according to one embodiment.

FIG. 8 illustrates the metadata-driven image alignment and unwarping process as a module, and shows the input and output to the module, according to one embodiment. Metadata-driven image alignment and unwarping module 600 receives as input a set of composite images 610 and the metadata 612 for the images, and precomputed camera/lens profiles 604. Metadata-driven image alignment and unwarping module 600 generates an output image 650, for example a spherical projection of input images 610. Output image 650 may, for example, be stored to a storage medium 660, such as system memory, a disk drive, DVD, CD, etc.

One embodiment may provide a user interface 602 that provides one or more user interface elements that enable the user to, for example, specify input images 610 and specify a format or other information or instructions for the output image 650. In one embodiment, user interface 602 may allow a user to override the default behavior by identifying a custom camera/lens profile, for example when metadata 612 is unavailable or inadequately identifies the camera/lens combination.

Figure 9:
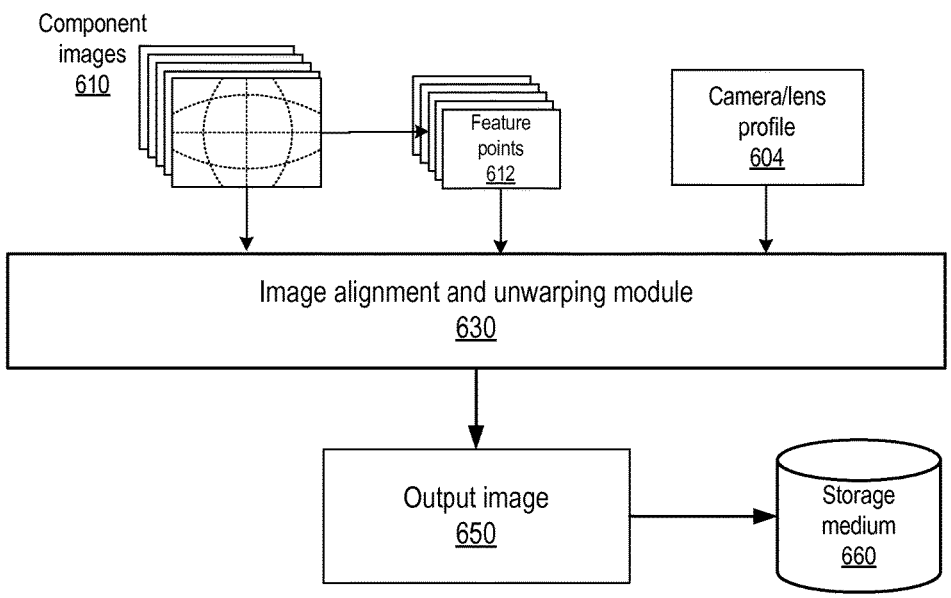
FIG. 9 illustrates an image alignment and unwarping method as a module, and shows the input and output to the module, according to one embodiment.

FIG. 9 illustrates the image alignment and unwarping method as a module, and shows the input and output to the module, according to one embodiment. Image alignment and unwarping module 630 receives as input a set of composite images 610, computed feature points 612 for the images 610, and a precomputed camera/lens profile 604 for the images 610. Image alignment and unwarping module 630 generates an output image 650, for example a spherical projection of input images 610. Output image 650 may, for example, be stored to a storage medium 660, such as system memory, a disk drive, DVD, CD, etc.

It is to be noted that an embodiment of the image alignment and unwarping module 630 as described herein may be implemented in an embodiment of metadata-driven image alignment and unwarping module 600 to perform the function of aligning and unwarping distorted images. However, metadata-driven image alignment and unwarping module 600 may be used with other implementations of an image alignment and unwarping process.

Exemplary System

Various components of embodiments of a metadata-driven multi-image processing module, a metadata-driven image alignment and unwarping module and/or an image alignment and unwarping module as described herein may be executed on one or more computer systems, which may interact with various other devices. One such computer system is illustrated by FIG. 10. In the illustrated embodiment, computer system 700 includes one or more processors 710 coupled to a system memory 720 via an input/output (I/O) interface 730. Computer system 700 further includes a network interface 740 coupled to I/O interface 730, and one or more input/output devices 750, such as cursor control device 760, keyboard 770, audio device 790, and display(s) 780. In some embodiments, it is contemplated that embodiments may be implemented using a single instance of computer system 700, while in other embodiments multiple such systems, or multiple nodes making up computer system 700, may be configured to host different portions or instances of embodiments. For example, in one embodiment some elements may be implemented via one or more nodes of computer system 700 that are distinct from those nodes implementing other elements.

In various embodiments, computer system 700 may be a uniprocessor system including one processor 710, or a multiprocessor system including several processors 710 (e.g., two, four, eight, or another suitable number). Processors 710 may be any suitable processor capable of executing instructions. For example, in various embodiments, processors 710 may be general-purpose or embedded processors implementing any of a variety of instruction set architectures (ISAs), such as the x86, PowerPC, SPARC, or MIPS ISAs, or any other suitable ISA. In multiprocessor systems, each of processors 710 may commonly, but not necessarily, implement the same ISA.

System memory 720 may be configured to store program instructions and/or data accessible by processor 710. In various embodiments, system memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for a metadata-driven multi-image processing module, a metadata-driven image alignment and unwarping module and/or an image alignment and unwarping module, are shown stored within system memory 720 as program instructions 725 and data storage 735, respectively. In other embodiments, program instructions and/or data may be received, sent or stored upon different types of computer-accessible media or on similar media separate from system memory 720 or computer system 700. Generally speaking, a computer-accessible medium may include storage media or memory media such as magnetic or optical media, e.g., disk or CD/DVD-ROM coupled to computer system 700 via I/O interface 730. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 740.

In one embodiment, I/O interface 730 may be configured to coordinate I/O traffic between processor 710, system memory 720, and any peripheral devices in the device, including network interface 740 or other peripheral interfaces, such as input/output devices 750. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. In addition, in some embodiments some or all of the functionality of I/O interface 730, such as an interface to system memory 720, may be incorporated directly into processor 710.

Network interface 740 may be configured to allow data to be exchanged between computer system 700 and other devices attached to a network, such as other computer systems, or between nodes of computer system 700. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or retrieving data by one or more computer system 700. Multiple input/output devices 750 may be present in computer system 700 or may be distributed on various nodes of computer system 700. In some embodiments, similar input/output devices may be separate from computer system 700 and may interact with one or more nodes of computer system 700 through a wired or wireless connection, such as over network interface 740.

As shown in FIG. 8, memory 720 may include program instructions 725, configured to implement embodiments of a metadata-driven multi-image processing module, a metadata-driven image alignment and unwarping module and/or an image alignment and unwarping module as described herein, and data storage 735, comprising various data accessible by program instructions 725. In one embodiment, program instructions 725 may include software elements of a metadata-driven multi-image processing module, a metadata-driven image alignment and unwarping module and/or an image alignment and unwarping module as illustrated in the above Figures. Data storage 735 may include data that may be used in embodiments. In other embodiments, other or different software elements and data may be included.

Those skilled in the art will appreciate that computer system 700 is merely illustrative and is not intended to limit the scope of a metadata-driven multi-image processing module, a metadata-driven image alignment and unwarping module and/or an image alignment and unwarping module as described herein. In particular, the computer system and devices may include any combination of hardware or software that can perform the indicated functions, including computers, network devices, internet appliances, PDAs, wireless phones, pagers, etc. Computer system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 700 may be transmitted to computer system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer-implemented method, comprising:
performing, by one or more computing devices:
estimating, from image content of a captured image, a value for a parameter to be used in a digital image processing technique when applied to the captured image;
obtaining, from metadata corresponding to the captured image, a value for the parameter determined when capturing the captured image;
determining that a difference between the estimated value for the parameter and the value for the parameter obtained from the metadata exceeds a threshold; and
applying the digital image processing technique to the captured image to generate an output image, the value for the parameter obtained from the metadata used in the digital image processing technique instead of the estimated value in response to said determining that the difference exceeds the threshold.

2. The computer-implemented method as recited in claim 1, wherein the digital image processing technique is a vignette removal process, and wherein the parameter is exposure.

3. The computer-implemented method as recited in claim 1, wherein the digital image processing technique is a vignette removal process, and wherein the parameter is one of one or more parameters used in a vignette model applied during the vignette removal process.

4. The computer-implemented method as recited in claim 1, wherein the digital image processing technique is a lens distortion removal process, and wherein the parameter is one of one or more parameters used in a lens distortion model applied during the lens distortion removal process.

5. The computer-implemented method as recited in claim 1, wherein the digital image processing technique is a chromatic aberration removal process, and wherein the parameter is one of one or more parameters used in a chromatic aberration model applied during the chromatic aberration removal process.

6. The computer-implemented method as recited in claim 1, wherein the digital image processing technique is a sensor noise removal process, and wherein the parameter is one of one or more parameters used in a sensor noise model applied during the sensor noise removal process.

7. The computer-implemented method as recited in claim 1, further comprising, prior to said estimating, determining that the digital image processing technique is to be applied to the captured image according to the metadata corresponding to the images.

8. A system, comprising:
at least one processor; and
a memory comprising program instructions that are executable by the at least one processor to:
estimate, from image content of a captured image, a value for a parameter to be used in a digital image processing technique when applied to the captured image;
obtain, from metadata corresponding to the captured image, a value for the parameter determined when capturing the captured image;
determine that a difference between the estimated value for the parameter and the value for the parameter obtained from the metadata exceeds a threshold; and
apply the digital image processing technique to the captured image to generate an output image, the value for the parameter obtained from the metadata used in the digital image processing technique instead of the estimated value in response to a determination that the difference exceeds the threshold.

9. The system as recited in claim 8, wherein the digital image processing technique is a vignette removal process, and wherein the parameter is exposure.

10. The system as recited in claim 8, wherein the digital image processing technique is a vignette removal process, and wherein the parameter is one of one or more parameters used in a vignette model applied during the vignette removal process.

11. The system as recited in claim 8, wherein the digital image processing technique is a lens distortion removal process, and wherein the parameter is one of one or more parameters used in a lens distortion model applied during the lens distortion removal process.

12. The system as recited in claim 8, wherein the digital image processing technique is a chromatic aberration removal process, and wherein the parameter is one of one or more parameters used in a chromatic aberration model applied during the chromatic aberration removal process.

13. The system as recited in claim 8, wherein the digital image processing technique is a sensor noise removal process, and wherein the parameter is one of one or more parameters used in a sensor noise model applied during the sensor noise removal process.

14. A non-transitory computer-readable storage medium storing program instructions that are computer-executable by a processor of a computer device to implement operations comprising:

estimating, from image content of a captured image, a value for a parameter to be used in a digital image processing technique when applied to the captured image;
obtaining, from metadata corresponding to the captured image, a value for the parameter determined when capturing the captured image;
determining that a difference between the estimated value for the parameter and the value for the parameter obtained from the metadata exceeds a threshold; and
applying the digital image processing technique to the captured image to generate an output image, the value for the parameter obtained from the metadata used in the digital image processing technique instead of the estimated value in response to said determining that the difference exceeds the threshold.

15. The non-transitory computer-readable storage medium as recited in claim 14, wherein the digital image processing technique is a vignette removal process, and wherein the parameter is exposure.

16. The non-transitory computer-readable storage medium as recited in claim 14, wherein the digital image processing technique is a vignette removal process, and wherein the parameter is one of one or more parameters used in a vignette model applied during the vignette removal process.

17. The non-transitory computer-readable storage medium as recited in claim 14, wherein the digital image processing technique is a lens distortion removal process, and wherein the parameter is one of one or more parameters used in a lens distortion model applied during the lens distortion removal process.

18. The non-transitory computer-readable storage medium as recited in claim 14, wherein the digital image processing technique is a chromatic aberration removal process, and wherein the parameter is one of one or more parameters used in a chromatic aberration model applied during the chromatic aberration removal process.

19. The non-transitory computer-readable storage medium as recited in claim 14, wherein the digital image processing technique is a sensor noise removal process, and wherein the parameter is one of one or more parameters used in a sensor noise model applied during the sensor noise removal process.

20. The non-transitory computer-readable storage medium as recited in claim 14, wherein the program instructions are further computer-executable to implement, prior to said estimating, determining that the digital image processing technique is to be applied to the captured image according to the metadata corresponding to the images.

* * * * *